(12) United States Patent
Kanaya et al.

(10) Patent No.: US 9,447,837 B2
(45) Date of Patent: Sep. 20, 2016

(54) FLUID-FILLED VIBRATION DAMPING DEVICE

(71) Applicant: SUMITOMO RIKO COMPANY LIMITED, Komaki-shi, Aichi (JP)

(72) Inventors: Tomohiro Kanaya, Kasugai (JP); Eisuke Asano, Komaki (JP)

(73) Assignee: SUMITOMO RIKO COMPANY LIMITED, Komaki-Shi (JP)

( * ) Notice: Subject to any disclaimer, the term of this patent is extended or adjusted under 35 U.S.C. 154(b) by 0 days.

(21) Appl. No.: 14/513,650

(22) Filed: Oct. 14, 2014

(65) Prior Publication Data

US 2015/0028530 A1    Jan. 29, 2015

Related U.S. Application Data

(63) Continuation of application No. PCT/JP2013/002787, filed on Apr. 24, 2013.

(30) Foreign Application Priority Data

| Apr. 27, 2012 | (JP) | ................................. 2012-102827 |
| Aug. 29, 2012 | (JP) | ................................. 2012-188526 |

(51) Int. Cl.
  *F16F 13/10* (2006.01)
  *F16F 13/08* (2006.01)

(52) U.S. Cl.
  CPC ............. *F16F 13/08* (2013.01); *F16F 13/103* (2013.01); *F16F 13/105* (2013.01); *F16F 13/102* (2013.01); *F16F 13/108* (2013.01); *F16F 2226/04* (2013.01); *Y10T 29/49615* (2015.01)

(58) Field of Classification Search
  CPC ...... F16F 13/10; F16F 13/102; F16F 13/105; F16F 13/103; F16F 13/108; F16F 2224/04
  USPC ........................................ 267/140.11, 140.13
  See application file for complete search history.

(56) References Cited

U.S. PATENT DOCUMENTS

| 6,053,487 A | 4/2000 | Yotani et al. |
| 7,306,210 B2 | 12/2007 | Happou et al. |

(Continued)

FOREIGN PATENT DOCUMENTS

| JP | A-2005-337348 | 12/2005 |
| JP | A-2008-002497 | 1/2008 |

(Continued)

OTHER PUBLICATIONS

Jul. 8, 2013 International Search Report issued in International Application No. PCT/JP2013/002787.

(Continued)

*Primary Examiner* — Thomas Irvin
(74) *Attorney, Agent, or Firm* — Oliff PLC

(57) ABSTRACT

A fluid-filled vibration damping device including: a primary liquid chamber which gives rise to pressure fluctuations based on deformation of a main rubber elastic body at times of vibration input; an auxiliary liquid chamber which gives rise to pressure fluctuations relative to the primary liquid chamber at times of vibration input; and an orifice passage that allows flow action of a sealed fluid between the primary liquid chamber and the auxiliary liquid chamber. The sealed fluid contains at least 0.03 volume % of a dissolved gas under atmospheric pressure at room temperature. A low-adhesion energy surface with a water contact angle of at least 90 degrees is provided on an inner surface of the primary liquid chamber.

20 Claims, 16 Drawing Sheets

(56) References Cited

U.S. PATENT DOCUMENTS

| | | | |
|---|---|---|---|
| 8,672,304 B2 | 3/2014 | Ueki | |
| 2003/0205856 A1* | 11/2003 | Hibi | F16F 13/105 267/140.13 |
| 2013/0277900 A1 | 10/2013 | Asano et al. | |
| 2014/0291905 A1* | 10/2014 | Kanaya | F16F 13/10 267/140.13 |

FOREIGN PATENT DOCUMENTS

| | | |
|---|---|---|
| JP | A-2008-106895 | 5/2008 |
| JP | A-2010-078032 | 4/2010 |

OTHER PUBLICATIONS

International Search Report issued in International Patent Application No. PCT/JP2013/002787 dated Jul. 9, 2013.

* cited by examiner

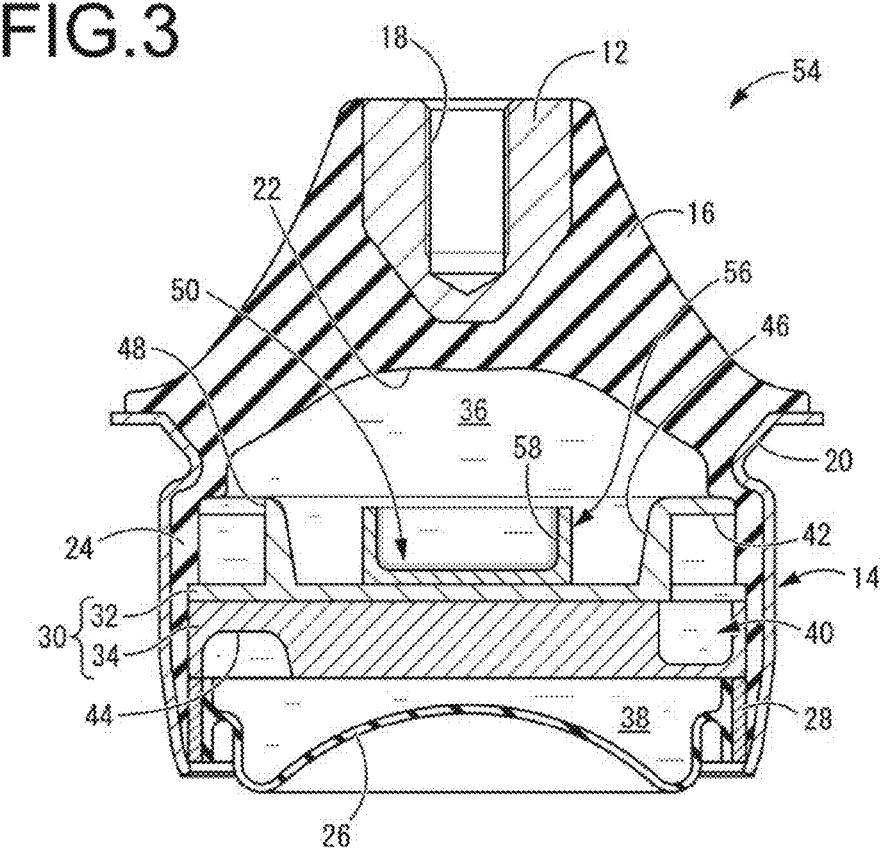
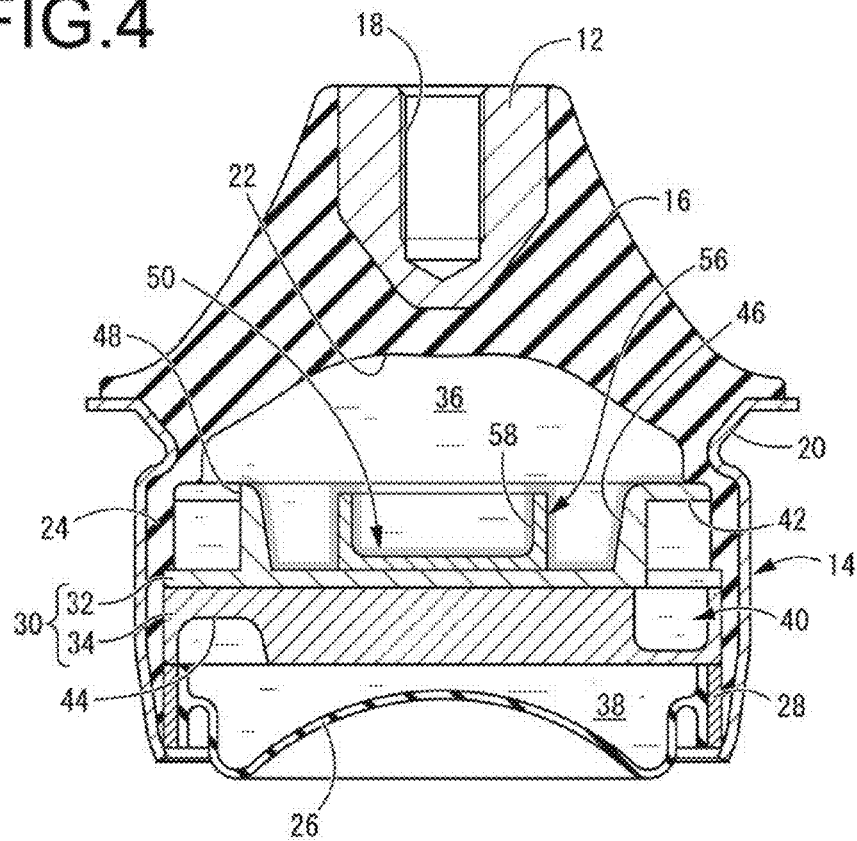

FLUID-FILLED VIBRATION DAMPING DEVICE

INCORPORATED BY REFERENCE

The disclosures of Japanese Patent Application Nos. 2012-102827 filed on Apr. 27, 2012 and 2012-188526 filed on Aug. 29, 2012, each including the specification, drawings and abstract is incorporated herein by reference in its entirety. This is a Continuation of International Application No. PCT/JP2013/002787 filed on Apr. 24, 2013.

BACKGROUND OF THE INVENTION

1. Field of the Invention

The present invention relates to a fluid-filled vibration damping device used for an automotive engine mount and the like, for example, and particularly relates to technology that can provide effective and simple resolution measures for noise due to cavitation that occurs with input of an impact load and the like.

2. Description of the Related Art

From the past as one type of vibration damping device such as a vibration damping coupling unit or vibration damping support unit interposed between members constituting a vibration transmission system, a fluid-filled vibration damping device that uses a vibration damping effect based on the fluid flow action of fluid sealed in the interior is known. This fluid-filled vibration damping device, for example as noted in Japanese Unexamined Patent Publication No. JP-A-2005-337348, has a structure that includes a primary liquid chamber which gives rise to pressure fluctuations based on deformation of the main rubber elastic body when vibration is input, and an auxiliary liquid chamber which gives rise to pressure fluctuations relative to the primary liquid chamber when vibration is input, and these are in communication by an orifice passage. Also, a vibration damping effect is made to be exhibited based on the fluid flow action of non-compressible sealed fluid made to flow through the orifice passage between the primary liquid chamber and the auxiliary liquid chamber which give rise to relative pressure fluctuations when vibration is input.

However, with this kind of fluid-filled vibration damping device, there are cases when noise or vibration generated during input of an impact load becomes a problem. That noise or the like is thought to be due to cavitation air bubbles generated by a rapid decrease in pressure of the primary liquid chamber by input of an impact load.

For this kind of problem, as noted in U.S. Pat. No. 7,306,210, proposed is also a constitution for which a shunt flow path is provided that is equipped with a relief valve or the like between a pressure receiving chamber correlating to the primary liquid chamber and an equilibrium chamber correlating to the auxiliary liquid chamber, and for which excessive negative pressure in the primary liquid chamber is rapidly eliminated.

However, a relief valve, shunt flow path or the like need to be specially formed, and there was the problem that an increase in the number of parts and the structure becoming complex were unavoidable.

SUMMARY OF THE INVENTION

The present invention was created with the circumstances described above as the background, and the problem it is to address is to provide an effective measure for solving the noise due to cavitation generated with input of an impact load or the like, and particularly to provide a fluid-filled vibration damping device for which it is possible to avoid to the extent possible an adverse effect on the basic vibration damping performance, even when cavitation noise has become a problem after basic design is completed.

The first mode of the present invention provides a fluid-filled vibration damping device including: a primary liquid chamber which gives rise to pressure fluctuations based on deformation of a main rubber elastic body at times of vibration input; an auxiliary liquid chamber which gives rise to pressure fluctuations relative to the primary liquid chamber at times of vibration input; and an orifice passage that allows flow action of a sealed fluid between the primary liquid chamber and the auxiliary liquid chamber, wherein the sealed fluid contains at least 0.03 volume % of a dissolved gas under atmospheric pressure at room temperature, and a low-adhesion energy surface with a water contact angle of at least 90 degrees is provided on an inner surface of the primary liquid chamber.

With the fluid-filled vibration damping device of the constitution according to the present invention, since at least 0.03 volume % of a dissolved gas is dissolved in a liquid that is a non-compressible fluid under atmospheric pressure at room temperature, when there is a great decrease in the pressure of the primary liquid chamber due to input of an impact load, before the occurrence of vaporous cavitation which is so-called cavitation, a phenomenon of aeration which is gaseous cavitation is generated, and the gas that was dissolved in the liquid appears as air bubbles. Also, a low-adhesion energy surface with a water contact angle of 90 degrees or greater is provided on the wall surface of the primary liquid chamber for which it is especially easy for the aeration air bubbles to appear, so the air bubbles that appear do not expand on the wall surface of the primary liquid chamber, and become a shape close to a lens shape or sphere shape. As a result, when there is a decrease in pressure of the primary liquid chamber, the air bubbles are manifested and maintained with more stability, and those air bubbles exhibit a negative pressure absorption reduction action on the primary liquid chamber, and by avoiding a marked pressure decrease in the primary liquid chamber, cavitation (vaporous cavitation) is prevented, and noise or vibration due to cavitation is effectively suppressed.

In particular, with the present invention, it is possible to reduce noise and the like due to cavitation by providing a low-adhesion energy surface on at least a part of the inner surface of the primary liquid chamber by changing the material of the members constituting the primary liquid chamber, by processing the member surface exposed to the primary liquid chamber or the like, for example, without making changes to the basic constitution of the primary liquid chamber, the auxiliary liquid chamber, the orifice passage or the like. Because of that, even at the stage after the fluid-filled vibration damping device design is completed, it is possible to use a simple countermeasure for the cavitation noise while avoiding an adverse effect on the basic vibration damping performance as practicably as possible.

However, with the present invention, the constitutions as noted below can be used in combination as appropriate or as necessary.

The second mode of the present invention provides the fluid-filled vibration damping device according to the first mode, wherein the volume of the dissolved gas contained in the sealed fluid is not greater than 61200 volume % under atmospheric pressure at room temperature.

With this mode, by having the dissolved gas content be 61200 volume % or less under atmospheric pressure at room temperature, it is possible to avoid the gas dissolving into the sealed fluid being more difficult than necessary. It is also possible to avoid a decrease in the vibration damping performance of the orifice passage due to the appearance of gas unnecessarily also when the pressure decrease of the primary liquid chamber is small.

With the present invention, room temperature is the temperature of the state for which heating or cooling is not added at least during usage start or in the manufacturing process, and is normally 25° C. Also, atmospheric pressure means the pressure in a state when added pressure or reduced pressure is not applied at least at usage start or in the manufacturing process, and is normally standard atmospheric pressure.

The third mode of the present invention provides the fluid-filled vibration damping device according to the first or second mode, wherein the low-adhesion energy surface is provided directly on a surface of a constitutional member constituting the primary liquid chamber.

With this mode, by having the low-adhesion energy surface formed directly on the surface of the constitutional member constituting the primary liquid chamber, it is possible to implement the present invention easily and efficiently compared to when changing all the material of the constitutional member, for example. The surface processing for forming the low-adhesion energy surface can be to form by laminating material layers having the physical property of a water contact angle of 90 degrees or more, or to do lamination fixing after forming separate items or the like on the surface of the constitutional member, for example, but surface processing by implementing a film coating on the surface of the constitutional member allows easy formation of the target low-adhesion energy surface. In specific terms, it is also possible to obtain a low-adhesion energy surface using a fluororesin coating, or by irradiation processing of radiation or the like, for example.

The fourth mode of the present invention provides the fluid-filled vibration damping device according to the first or second mode, wherein the low-adhesion energy surface is provided by attaching an independent member having a low-adhesion energy surface with a water contact angle of at least 90 degrees on its surface to the surface of the constitutional member constituting the primary liquid chamber.

With this mode, the low-adhesion energy surface is provided on at least a part of the wall inner surface of the primary liquid chamber by attaching an independent member having a low-adhesion energy surface on its surface on the wall inner surface of the primary liquid chamber without making changes to the basic structure of the primary liquid chamber, the auxiliary liquid chamber, the orifice passage or the like, making it possible to reduce noise or the like due to cavitation. Because of that, even at the stage after the fluid-filled vibration damping device design is completed, it is possible to devise a simple countermeasure for cavitation noise while avoiding to the extent possible adverse effects on the basic vibration damping performance.

In fact, by the independent member equipped with the low-adhesion energy surface being a separate item from the constitutional member constituting the wall surface of the primary liquid chamber (main rubber elastic body, partition member or the like), it is possible to provide the low-adhesion energy surface on the wall inner surface of the primary liquid chamber without limiting the materials of the constitutional member constituting the wall surface of the primary liquid chamber. Because of that, it is possible to realize a reduction in cavitation noise while handling to a high degree the required vibration damping characteristics and durability, weight restrictions and the like.

The fifth mode of the present invention provides the fluid-filled vibration damping device according to the fourth mode, wherein the independent member extends in a circumference direction, and the independent member is overlapped on and attached to an inner surface of a circumference wall provided in the primary liquid chamber.

With this mode, it is possible to efficiently obtain a large surface area of the independent member attached to the wall inner surface of the primary liquid chamber, and to ensure a large surface area of the low-adhesion energy surface at the wall inner surface of the primary liquid chamber. As a result, the cavitation noise reduction action by air bubbles being stabilized and held or the like is effectively exhibited. In fact, the inner circumference part of the primary liquid chamber does not require an attachment structure for the independent member or an installation space for the independent member, so it is possible to arrange various devices including a liquid pressure absorption mechanism, a negative pressure reduction relief valve mechanism or the like.

The sixth mode of the present invention provides the fluid-filled vibration damping device according to the fifth mode, wherein the independent member is housed in the primary liquid chamber in an elastically curved state so as to extend in the circumference direction, and the independent member is pressed against and attached to the inner surface of the circumference wall provided in the primary liquid chamber by its own elasticity.

With this mode, the independent member is pressed against and attached to the circumference wall inner surface of the primary liquid chamber by its own elasticity, without requiring a special fixing means, so simplification of the structure is realized, and it is also possible to devise a simpler countermeasure for cavitation noise at the stage after the fluid-filled vibration damping device design is completed.

The seventh mode of the present invention provides the fluid-filled vibration damping device according to the fifth mode, wherein the independent member has a ring shape, and the independent member is fitted into and attached to the inner surface of the circumference wall provided in the primary liquid chamber.

With this mode, by the ring shaped independent member being fitted into the circumference wall inner surface of the primary liquid chamber, the independent member is pressed against the circumference wall inner surface of the primary liquid chamber and held. Because of that, the independent member is attached without requiring a special fixing means, and simplification of the structure as well as providing of a simpler countermeasure means for the cavitation noise are realized.

The eighth mode of the present invention provides the fluid-filled vibration damping device according to any of the fourth through seventh modes, wherein a positioning member is provided that limits displacement of the independent member relative to the surface of the constitutional member constituting the primary liquid chamber.

With this mode, the position skew or falling out of the independent member in relation to the wall inner surface of the primary liquid chamber is prevented by the positioning member, so it is possible to stably obtain the target vibration damping characteristics or noise reduction action. In particular, by providing the positioning member separately from the attaching means for attaching the independent member to the wall inner surface of the primary liquid chamber, and by using the attaching means and the positioning member in combination, it is possible to more effectively realize positioning of the independent member in relation to the wall inner surface of the primary liquid chamber.

The ninth mode of the present invention provides the fluid-filled vibration damping device according to any of the first through eighth modes, wherein the low-adhesion energy surface is formed by a surface processed layer provided on a surface of a member exposed to the sealed fluid of the primary liquid chamber.

With this mode, by forming the low-adhesion energy surface with surface processed layer on the surface of the member exposed to the sealing fluid of the primary liquid chamber, it is possible to implement the present invention more easily and efficiently than when changing the all the material of the constitutional member or the like, for example.

The tenth mode of the present invention provides the fluid-filled vibration damping device according to any of the first through ninth modes, further including: a first mounting member and a second mounting member respectively attached to members constituting a vibration transmission system while being connected by the main rubber elastic body; and a partition member supported by the second mounting member, wherein the primary liquid chamber whose wall is partially constituted by the main rubber elastic body is formed on a first side of the partition member, while the auxiliary liquid chamber is formed on a second side of the partition member, and the low-adhesion energy surface is provided on a surface of the first side of the partition member.

With this mode, using a partition member that divides the primary liquid chamber and the auxiliary liquid chamber, by providing the low-adhesion energy surface on that partition member, formation of the low-adhesion energy surface becomes easy, and also, the level of freedom for setting the position for providing the low-adhesion energy surface increases, and it is possible to easily ensure the surface area for the low-adhesion energy surface as well.

The eleventh mode of the present invention provides the fluid-filled vibration damping device according to the tenth mode, wherein the low-adhesion energy surface is provided on at least one of a surface exposed to the sealed fluid of the primary liquid chamber on the partition member which serves as a constitutional member constituting the primary liquid chamber and a surface exposed to the sealed fluid of the primary liquid chamber on a separate member attached to the partition member.

With this mode, since the member on which the low-adhesion energy surface is provided is attached as a separate member to the partition member, it is less likely for problems such as other member position skew or falling off or the like occurring compared to a case when attached to the main rubber elastic body which is actively elastically deformed when vibration is input. With this mode, when the low-adhesion energy surface is provided on the surface exposed to the sealed fluid of the primary liquid chamber with the separate member attached to the partition member, that separate member is used as the independent member noted in the fourth through eighth modes.

The twelfth mode of the present invention provides the fluid-filled vibration damping device according to the eleventh mode, wherein the partition member or the separate member on which the low-adhesion energy surface is provided is formed using a thermoplastic synthetic resin.

With this mode, for example when a separate member on which the low-adhesion energy surface is formed is provided, it is possible to avoid the material of the partition member being limited, and it is possible to form a strong low-adhesion energy surface by forming the separate member using stainless steel or using baking of a fluorine resin or the like while forming the partition member using a thermoplastic synthetic resin that has excellent formability as well as being light.

The thirteenth mode of the present invention provides the fluid-filled vibration damping device according to any of the first through twelfth modes, wherein the low-adhesion energy surface is provided at a position separated from an opening part of the orifice passage to the primary liquid chamber.

With this mode, by avoiding a large fluid pressure action by the fluid flow action through the orifice passage, as described previously, the appearance and continuation of dissolved gas air bubbles in the primary liquid chamber is stabilized and it is possible to more stably exhibit the target reduction effect of noise or the like due to cavitation.

The fourteenth mode of the present invention provides the fluid-filled vibration damping device according to any of the first through thirteenth modes, wherein a fluid retention area having irregularities is provided on the inner surface of the primary liquid chamber, and the low-adhesion energy surface is formed on an inner surface of the fluid retention area.

With this mode, by forming the low-adhesion energy surface at the fluid retention area, an adverse effect on the fluid flow action caused inside the primary liquid chamber during vibration input is suppressed, and as described previously, the appearance and continuation of the dissolved gas air bubbles in the primary liquid chamber can be stabilized. By so doing, it is possible to more stably obtain the target reduction effect of noise or the like due to cavitation using the dissolved gas air bubbles.

The fifteenth mode of the present invention provides the fluid-filled vibration damping device according to the fourteenth mode, wherein the fluid retention area is formed with a recess shape opening in the primary liquid chamber.

With this mode, by using a recess shape opening in the primary liquid chamber, it is possible to form the low-adhesion energy surface ensuring a larger surface area for the area in which the adverse effect due to fluid flow action inside the primary liquid chamber is avoided. This recess shaped fluid retention area is formed on the surface of the main rubber elastic body, and by forming on the surface of the partition member described previously, it is possible to more advantageously realize this with a simple structure without involving an increase in special members.

The sixteenth mode of the present invention provides the fluid-filled vibration damping device according to any of the first through fifteenth modes, wherein a powder body to be gasified by being exposed to the sealed fluid is sealed in a containing area of the sealed fluid, and the gasified powder body serves as the dissolved gas.

With this mode, the substance that generates gas with dissolving or the like into the sealed fluid can be added to a solvent in a solid or liquid state, and it is possible to easily realize a large volume of dissolved gas.

The seventeenth mode of the present invention provides the fluid-filled vibration damping device according to the sixteenth mode, wherein a dispersion material composed of the powder body is sealed in the containing area of the sealed fluid as a gas mixing composite constituted by a surface of the dispersion material being coated by a solid or gel form dispersion medium to be dissolved in the sealed fluid. With this mode, it is possible to easily handle the dispersion material composed of the powder body.

The eighteenth mode of the present invention provides the fluid-filled vibration damping device according to the seventeenth mode, wherein the solid or gel form dispersion medium is one of gelatin, pectin, and agar.

The nineteenth mode of the present invention provides the fluid-filled vibration damping device according to any of the sixteenth through eighteenth modes, wherein a dispersion material composed of the powder body includes at least one substance selected from the group consisting of ammonium chloride, ammonium sulfate, ammonium hydroxide, ammonium bicarbonate, and ammonium carbonate.

The twentieth mode of the present invention provides the fluid-filled vibration damping device according to any of the first through nineteenth modes, wherein the low-adhesion energy surface has a contact angle of at least 90 degrees in the sealed fluid with respect to air bubbles that appear due to aeration caused by a pressure decrease in the primary liquid chamber.

With this mode, by the contact angle of the dissolved gas air bubbles that appear in the primary liquid chamber in relation to the low-adhesion energy surface being made large, it is possible to maintain pressure inside the air bubbles with the air bubbles being close to a spherical shape, and by having the air bubbles in the liquid being continued with more stability, it is possible to more effectively exhibit the primary liquid chamber pressure easing action.

Also, the present invention provides a manufacturing method of a fluid-filled vibration damping device that includes a primary liquid chamber which gives rise to pressure fluctuations based on deformation of a main rubber elastic body at times of vibration input, an auxiliary liquid chamber which gives rise to pressure fluctuations relative to the primary liquid chamber at times of vibration input, and an orifice passage that allows flow action of a sealed fluid between the primary liquid chamber and the auxiliary liquid chamber, the method including the steps of: providing a low-adhesion energy surface with a water contact angle of at least 90 degrees to at least a part of a surface of the primary liquid chamber exposed to the sealed fluid; preparing a gas mixing composite constituted by a surface of a dispersion material composed of a powder body to be gasified by being exposed to the sealed fluid being coated by a solid or gel form dispersion medium to be dissolved in the sealed fluid; housing the gas mixing composite in a containing area of the sealed fluid and filling the sealed fluid in the containing area; and arranging the powder body gasified inside the sealed fluid filled in the containing area so as to be contained as a dissolved gas of the sealed fluid at a concentration of at least 0.03 volume %.

With this kind of method of the present invention, when manufacturing the fluid-filled vibration damping device constituted according to the present invention which can exhibit reduction effects on noise or the like due to cavitation, it is possible to easily arrange a designated volume of dissolved gas to be contained in the sealed fluid, and it is possible to more easily manufacture the target fluid-filled vibration damping device.

With the fluid-filled vibration damping device constituted according to the present invention, by effectively maintaining dissolved gas air bubbles that appear in the primary liquid chamber using aeration, a negative pressure absorption reduction action is exhibited by those air bubbles, and noise and vibration due to cavitation are effectively suppressed. In fact, by providing a low-adhesion energy surface on the surface of the constitutional member constituting the primary liquid chamber, or on the surface of the independent member attached to that constitutional member surface, it is possible to obtain the effect of the invention, so even at the stage after the fluid-filled vibration damping device design is completed, it is possible to realize a countermeasure on the cavitation noise while avoiding an adverse effect on the basic vibration damping performance.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIG. 3 is a vertical cross section showing a fluid-filled vibration damping device as a second embodiment of the present invention;

FIG. 4 is a vertical cross section showing a fluid-filled vibration damping device as a third embodiment of the present invention;

DETAILED DESCRIPTION OF PREFERRED EMBODIMENTS

Figure 1:
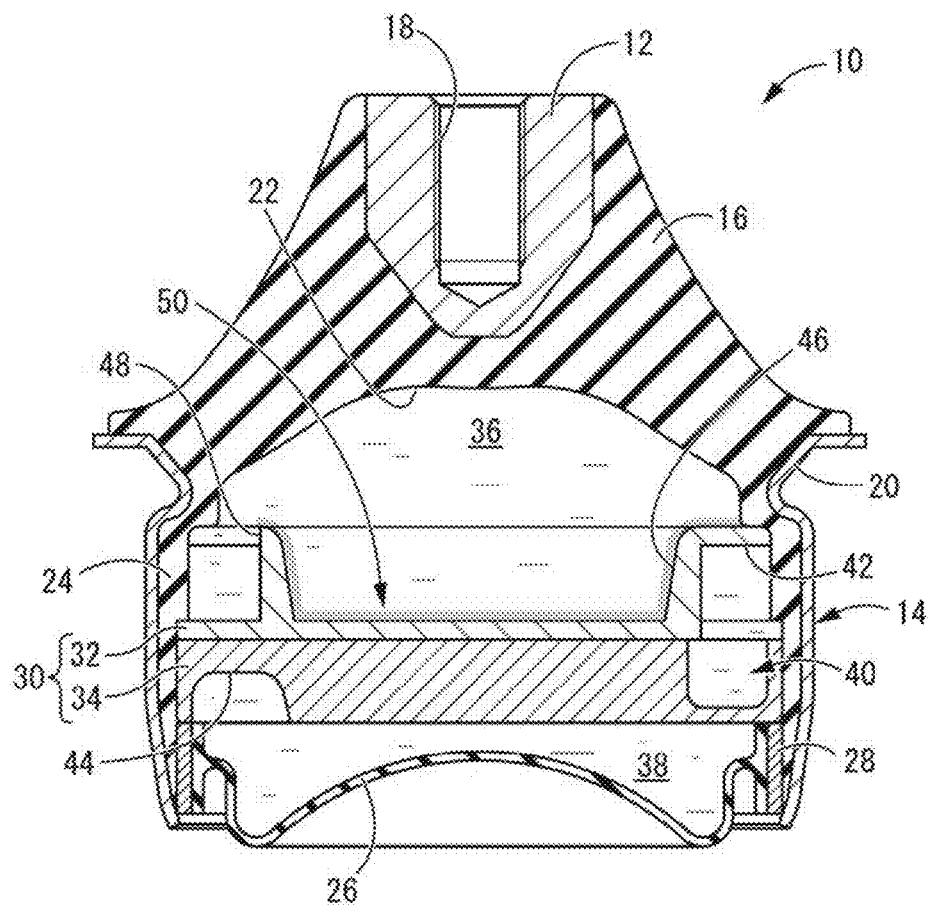
FIG. 1 is a vertical cross section showing a fluid-filled vibration damping device as a first embodiment of the present invention.

Hereafter, we will describe embodiments of the present invention while referring to the drawings.

FIG. 1 shows an automotive engine mount 10 as a first embodiment of fluid-filled vibration damping device constituted according to the present invention. The engine mount 10 has a constitution in which a first mounting member 12 and a second mounting member 14 are elastically connected by the main rubber elastic body 16. Also, by one of the first mounting member 12 and the second mounting member 14 being attached to the power unit side, and the other being attached to the vehicle body, the power unit is supported with vibration damping on the vehicle body of an automobile. In the description hereafter, the vertical direction means the vertical direction in FIG. 1 as a rule, and is the direction in which the elastic principal axis, which is the center axis of the engine mount 10, extends.

In more specific detail, the first mounting member 12 has a round short pillar shape extending in the vertical direction, and the lower edge part is an inverted frustoconical shape for which the diameter becomes smaller in the axial direction facing downward. On the center axis, a fixing bolt hole 18 is provided opening at the top end surface, and the power unit is fixed by a fixing bolt screwed into this fixing bolt hole 18.

The second mounting member 14 has a large diameter, roughly round tube shape extending in the vertical direction, and is made to be fixed to a vehicle body via an attachment bracket (not illustrated), for example. Also, on the second mounting member 14, a circumference groove shaped constricted part 20 is provided near the upper edge part, and a flange part is integrally formed on the opening circumference edge part of the axial direction top side. Also, the constricted part 20 is a tapered tube part for which the diameter gradually expands facing the upper opening part side. Also, the first mounting member 12 is arrange on roughly the same center axis, separated in the axial direction upward from the second mounting member 14, and the outer circumference surface of the inverted frustoconical form of the first mounting member 12 and the inner circumference surface of the tapered tube part of the second mounting member 14 are positioned mutually facing each other.

Furthermore, the main rubber elastic body 16 has a roughly frustoconical form, and while the first mounting member 12 is fixed in an embedded state at the center part of the small diameter side end part, the inner circumference surface of the upper end part of the second mounting member 14 is fixed to the outer circumference surface of the large diameter side end part. Also, between the facing surfaces of the outer circumference surface of the first mounting member 12 and the inner circumference surface of the upper end part of the second mounting member 14 is elastically connected by the main rubber elastic body 16. The main rubber elastic body 16 is an integral vulcanized molded component having the first and second mounting members 12 and 14. Also, a large-diameter recess 22 of an inverted, roughly bowl shape opening at the large diameter side end surface is formed on the main rubber elastic body 16. Furthermore, a sealing rubber layer 24 covering roughly the entire surface is formed on the inner circumference surface of the second mounting member 14 integrally with the main rubber elastic body 16 made so as to extend out in the axial direction downward from the main rubber elastic body 16.

Also, a thin walled rubber diaphragm 26 is installed as a flexible film in the opening part of the lower side of the second mounting member 14. A ring shaped mating fitting 28 is adhered by vulcanization to the outer circumference surface of the diaphragm 26, and by this mating fitting 28 being mated and fixed to the opening part of the lower side of the second mounting member 14, the lower side opening of the second mounting member 14 is sealed to be fluid tight by the diaphragm 26.

By so doing, on the interior of the second mounting member 14, between the facing surfaces of the main rubber elastic body 16 and the diaphragm 26, a liquid sealing area serving as a containing area is defined that is closed to the outside space and is filled with the non-compressible sealed fluid.

Also, in this liquid sealing area, a partition member 30 is housed and arranged. The partition member 30 has an upper partition plate 32 and a lower partition plate 34 overlapping, both of which have roughly a round disk shape, and overall has a round disk shape of a designated thickness. This partition member 30 is attached in a state fitted into the second mounting member 14 and broadening in the axis-perpendicular direction at the axial direction middle part, and the partition member 30 outer circumference surface is mated and fixed to the inner circumference surface of the second mounting member 14 via the sealing rubber layer 24. The upper partition plate 32 and the lower partition plate 34 constituting the partition member 30 are hard members formed using a metal such as iron or aluminum alloy, or a thermoplastic or heat curing synthetic resin or the like, and with this embodiment, are formed using metal.

By so doing, the liquid sealing area is divided at both the upper and lower sides by the partition member 30, and above the partition member 30, formed is a primary liquid chamber 36 whose wall is partially constituted by the main rubber elastic body 16 and which gives rise to pressure fluctuations based on the elastic deformation of the main rubber elastic body 16 when vibration is input. Also, below the partition member 30, formed is an auxiliary liquid chamber 38 whose wall is partially constituted by the diaphragm 26 and which, by having volume changes allowed easily, avoids pressure fluctuations and is kept at roughly atmospheric pressure. Therefore, with this embodiment, the main rubber elastic body 16 and the partition member 30 are constitutional members constituting the primary liquid chamber 36.

Also, an orifice passage 40 for which the outer circumference part extends a designated length in the circumference direction is formed on the partition member 30, relative pressure fluctuations are generated between the primary liquid chamber 36 and the auxiliary liquid chamber 38 during vibration input, and fluid flow action is allowed through the orifice passage 40 between the liquid chambers 36 and 38. With this embodiment, by having an upper groove 42 that extends at a length slightly less than one loop in the circumference direction opening at the outer circumference surface at the outer circumference part of the upper partition plate 32 and a lower groove 44 that extends at a length slightly less than one loop in the circumference direction opening to the upper surface at the outer circumference part of the lower partition plate 34 be in communication with each other at the circumference direction end part of each one, the orifice passage 40 is formed extending overall as a length of less than one loop.

In particular with this embodiment, a large-diameter circular recess 46 that opens facing upward is formed at the center part of the upper partition plate 32. Also, an opening part 48 of the primary liquid chamber 36 side of the orifice passage 40 is formed open facing upward at the thick walled part of the outer circumference side of the circular recess 46. By so doing, the circular recess 46 is formed at a position deviated from the opening part 48 of the orifice passage 40, and at a position deviated from on the extension line in the opening direction of the opening part 48 of the orifice passage 40.

Furthermore, with this embodiment, the inner surface of the primary liquid chamber 36, in particular the upper surface of the partition member 30 which is the constitutional member constituting the primary liquid chamber 36, is substantially used as a low-adhesion energy surface 50 along the entire surface. This low-adhesion energy surface 50 is a surface with a water contact angle of 90 degrees or greater, and can also be realized by molding the upper partition plate 32, for example, by using a hydrophobic coating layer (non-polar substance), but ideally, the low-adhesion energy surface 50 can be formed by forming the hydrophobic material coating layer as the surface processed layer on the surface of the upper partition plate 32. By using the coating layer in this way, a large degree of freedom is ensured for selection of the material for the upper partition plate 32, and it is possible to easily obtain the low-adhesion energy surface 50 by ex post facto processing.

As the coating layer that gives the low-adhesion energy surface 50, for example, fluorine resins and silicone resins such as polytetrafluoroethylene (PTFE), tetrafluoroethylene-hexafluoropropylene copolymer resin (FEP), tetrafluoroethylene-perfluoroalkylvinyl ether copolymer resin (PFA), polychlorotrifluoroethylene (PCTFE), polyvinylidene fluoride (PVDF), polyvinyl fluoride (PVF), PTFE/PFA composite coating or the like give good hydrophobic properties with excellent durability, so can be suitably used. In particular, this kind of fluorine resin and the like exhibits water repellent properties and oil repellent properties, so can be even more suitably used with the present invention.

Specifically, as the sealed fluid for filling in the liquid sealing area, typically in addition to water, polar (hydrophilic) liquids composed of organic solvents such as ethylene glycol, propylene glycol, alkylene glycol, polyalkylene glycol and the like are used, and with that polar liquid as a medium, it is preferable to further add as necessary a polar substance as a solute. However, depending on the required characteristics there are also cases when a non-polar (hydrophobic) substance is added to the polar liquid, and in either case, even in cases when further using a non-polar solvent for the sealed fluid, it is possible to obtain the low-adhesion energy surface 50 by using a fluorine resin.

Also, with this embodiment, as the sealed fluid, an item containing dissolved gas of 0.03 to 61200 volume % under atmospheric pressure at room temperature is used. As the dissolved gas, in addition to air, it is suitable to use at least one selected from the group consisting of ammonia, hydrogen chloride, carbon dioxide, nitric monoxide, oxygen, carbon monoxide, hydrogen, nitrogen, neon, and helium. In particular, air, or a dissolved gas with greater hydrophilia than air can be suitably used, and by doing that, there is an improvement in the affinity to the solvent when a polar liquid is used as the sealed fluid, and the contact angle of the air bubbles to the low-adhesion energy surface 50 is made large, which is advantageous for the action of making it difficult for the air bubbles to disappear when they come close to a sphere shape.

Also, making the dissolved gas content volume larger is effective in preventing cavitation, so with the provided sealed fluid, it is preferable to set an even larger dissolved gas volume naturally dissolved under atmospheric pressure at room temperature. In specific terms, for example, it is possible to suitably use a sealed fluid containing dissolved gas of 0.10 volume % or greater under atmospheric pressure at room temperature.

Here, to easily realize a large dissolved gas volume, it is effective to add to the solvent a substance that generates gas in a solid or liquid state. In specific terms, an ammonium chloride, ammonium sulfate, ammonium hydroxide, ammonium bicarbonate, or ammonium carbonate powder body (dust or powder) is suitable, but in addition, it is also possible to use as an additive at least one foaming or non-foaming powder body selected from the group consisting of sodium bicarbonate, potassium bicarbonate, sodium hypochlorite, magnesium carbonate, calcium carbonate, dry ice, and calcium peroxide. Also, by adding calcium hydroxide together with ammonium chloride, it is easy for ammonia to be generated in the solvent, so it is possible to dissolve ammonia in the solvent. The powder body noted above can also be used as the dispersion material for a gas mixing composite 70 described later.

With the engine mount 10 of the constitution described above, when mainly vertical direction vibration is input between the first mounting member 12 and the second mounting member 14 in a state mounted on a vehicle, based on the relative pressure fluctuation caused between the primary liquid chamber 36 and the auxiliary liquid chamber 38, fluid flow action is caused through the orifice passage 40. Also, using the resonance action of the fluid that flows in the orifice passage 40 and the like, it is possible to exhibit the target vibration damping effect of a high attenuation effect or the like on engine shake, for example.

However, when an impact load is input to the engine mount 10 when a vehicle goes over a bump or the like, an excessive pressure decrease occurs suddenly in the primary liquid chamber 36, and it is easy for there to be a problem of noise or the like due to cavitation that occurs due to that.

Here, with the engine mount 10 of this embodiment, since dissolved gas is contained in the sealed fluid, aeration occurs before cavitation occurs, and air bubbles of the dissolved gas appear.

Also, since the pressure change volume of the primary liquid chamber 36 is absorbed and buffered by the air bubbles that appeared, there is a reduction in the marked pressure decrease of the primary liquid chamber 36, and as a result, cavitation is prevented, and thus an effect is exhibited of reducing the noise and vibration that can be read as being due to cavitation. In particular with the engine mount 10 of this embodiment, by having the low-adhesion energy surface 50 formed with a large water contact angle on the inner surface of the primary liquid chamber 36 for which it is easy for air bubbles of the dissolved gas to appear, the air bubbles that appear on this low-adhesion energy surface 50 are more effectively maintained, and there is more stable exhibition of the cavitation prevention effect by buffering the pressure change of the primary liquid chamber 36.

Figure 2A:
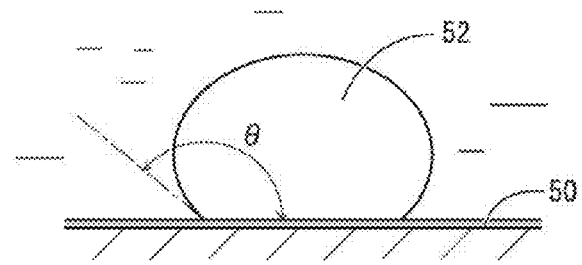
FIGS. 2A-2C are drawings suitable for describing air bubbles that appear in a primary liquid chamber by aeration of the dissolved gas.

Specifically, as shown in FIG. 2A, for air bubbles 52 that appear on the low-adhesion energy surface 50, the contact angle θ is a value according to the physical properties and surface state of the low-adhesion energy surface 50. Also, with this embodiment, by having the water contact angle be 90 degrees or greater, the low-adhesion energy surface 50 is given water repellent properties, and thus the contact angle θ of the air bubbles 52 is also made large. It is particularly suitable for the contact angle θ of the air bubbles 52 on the low-adhesion energy surface 50 in the sealed fluid to be set to 90 degrees or greater.

Figure 2B:
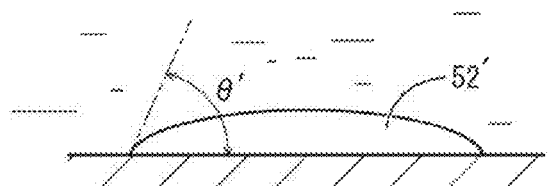
Figure 2C:
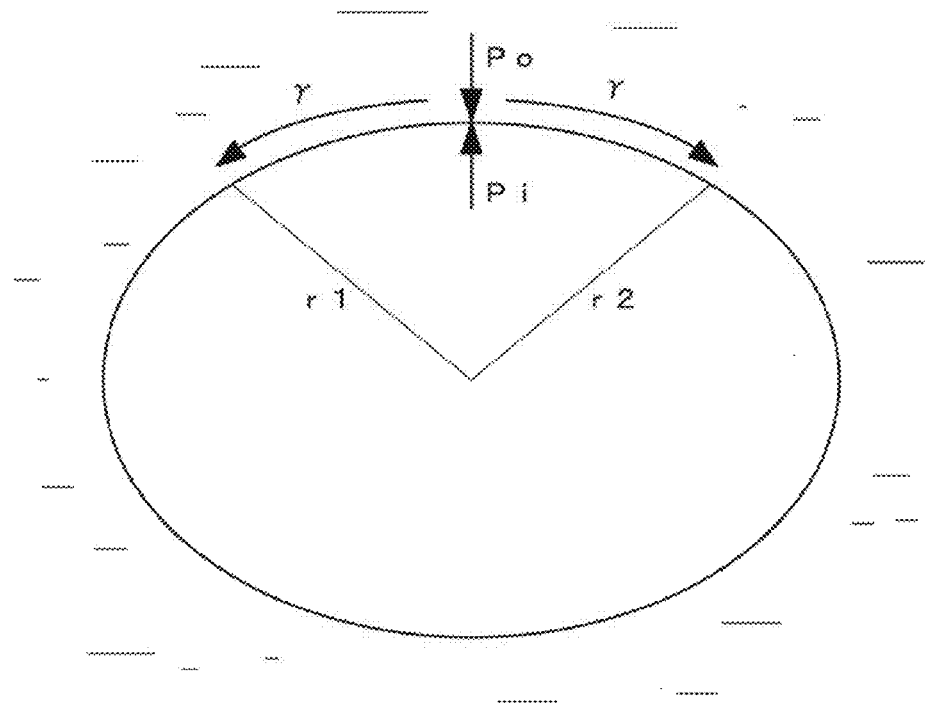

As a result, the air bubbles 52 that appeared on the low-adhesion energy surface 50 have a lens shape or a shape close to a sphere shape, and for example as shown in FIG. 2B, compared to air bubbles 52' for which the contact angle θ' is small and which has a flat expanding shape, the air bubbles 52 that appeared are stable and easier to maintain. The air bubbles 52 with the lens shape or shape close to a sphere shape shown in FIG. 2A, compared to the air bubbles 52' with a flat expanding shape shown in FIG. 2B, do not disappear easily when there is a pressure fluctuation in the primary liquid chamber 36, and following is the assumed reason for them being stable and easier to maintain. Specifically, as shown in FIG. 2C, when the relationship of the air bubbles internal pressure Pi and the external pressure Po found from the Young-Laplace formula expressed with the following formula and the ΔP determined by the boundary tension of the air bubbles surface and the air bubbles shape is as shown in the formula below, the air bubbles are easy to maintain and to grow.

$$Pi > Po + \Delta P$$

$$\Delta P = \gamma(1/r1 + 1/r2)$$

Here, γ is boundary tension, and r1 and r2 are the oval principal curvature radius, so when in a sphere shape, r1=r2=the minimum value. Because of that, as with the air bubbles 52 shown in FIG. 2A, by the surface area becoming smaller the closer it gets to a sphere shape, the external pressure action surface area becomes smaller, so the comprehensive external pressure acting on the air bubbles 52 is suppressed, and it is thought that this makes is easier to be maintained stably. It is also assumed that the critical boundary tension of the low-adhesion energy surface 50 being low is also a contributing factor.

Also, this theory was confirmed to be correct by visually seeing the status of air bubble generation and disappearance with vibration testing using a transparent model of an engine mount. In addition, from the experiment data described later as well, by the air bubbles 52 being maintained, it is possible to confirm a cavitation prevention effect due to buffering of the pressure change of the primary liquid chamber 36 by the air bubbles 52.

Also, with this embodiment, the low-adhesion energy surface 50 for which the manifestation of an adhered state of the air bubbles 52 is kept is formed at a position separated from the opening part 48 of the orifice passage 40 to the primary liquid chamber 36, and at an area displaced from the fluid outflow and inflow direction through the opening part 48 of the orifice passage 40. In addition to this, the low-adhesion energy surface 50 is formed with a shape of a circular recess 46 that opens to the primary liquid chamber 36, so the effect of the fluid flow action that occurs with the primary liquid chamber 36 when vibration is input is avoided, and it is possible to more stably maintain the air bubbles 52 inside the circular recess 46 that is a fluid retention area. Specifically, when the air bubbles are separated from the low-adhesion energy surface 50, there is the risk that a plurality of air bubbles will become joined together and become larger, bringing the risk of causing a new problem of noise or the like by the impact that occurs when the larger air bubbles disappear, and that kind of problem is effectively avoided by the air bubbles 52 being maintained on the low-adhesion energy surface 50.

However, the low-adhesion energy surface 50 can be formed having any shape, size, number or the like at any position on the surface exposed to the primary liquid chamber 36, and for example can be formed expanding as far as the inner surface of the orifice passage 40 or the inner surface of the auxiliary liquid chamber 38.

In specific terms, for example with an engine mount 54 shown in FIG. 3 as the second embodiment, a cup-shaped irregularity 56 that opens to the primary liquid chamber 36 is provided on the partition member 30, and a small center recess 58 is formed in the upper surface center area of the partition member 30, and with this center recess 58 as a fluid retention area, the inner surface of the center recess 58 can be used as the low-adhesion energy surface 50. With the embodiments noted hereafter, the members and parts with the same constitution as those of the first embodiment are given the same code numbers as those of the first embodiment in the drawings, and a detailed description of those will be omitted.

With this embodiment, with the center recess 58 that opens to a position sufficiently separated from the opening part 48 of the orifice passage 40, even when it is positioned lower than the opening part 48 to the primary liquid chamber 36 of the orifice passage 40 that opens facing upward, and is in the axis-perpendicular direction, since the fluid retention area is formed, the air bubbles manifested on the low-adhesion energy surface 50 are more effectively maintained without receiving almost any adverse effect due to the fluid flow action inside the primary liquid chamber 36.

Also, for example as shown in FIG. 4 as the third embodiment, both the center recess 58 and the circular recess 46 formed to its outer circumference side are used as fluid retention areas, and it is also possible to form the inner surfaces of both recesses 46 and 58 as the low-adhesion energy surface 50. By so doing, it is possible to form the low-adhesion energy surface 50 with an even larger surface area.

Figure 5:
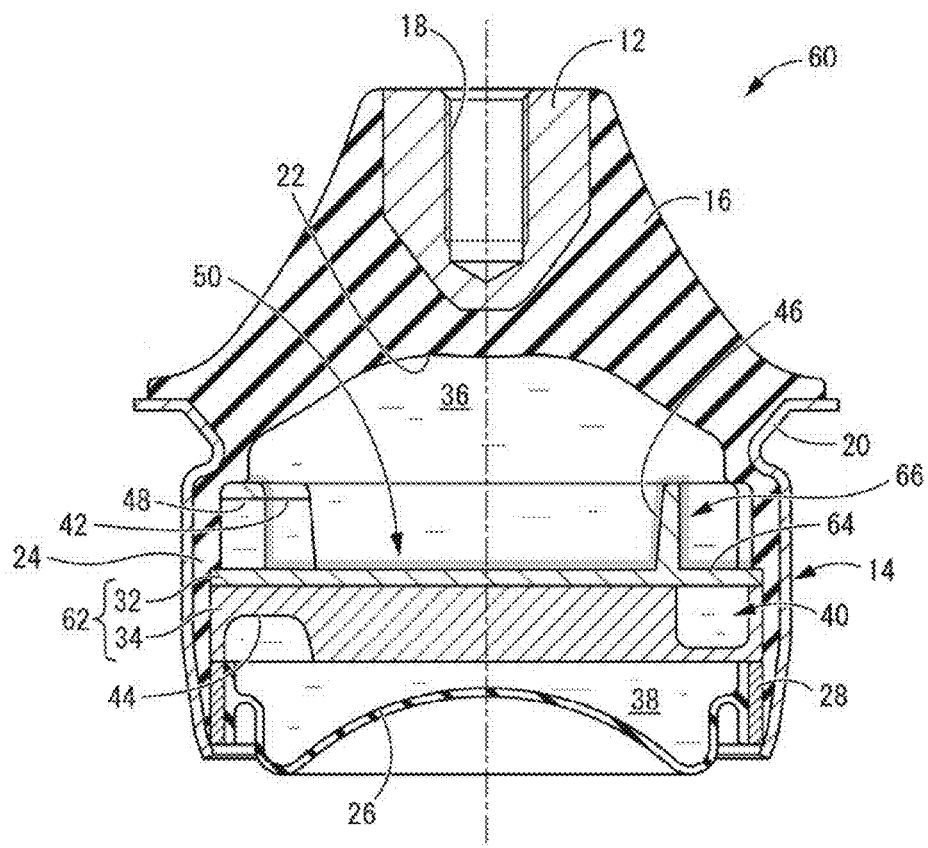
FIG. 5 is a vertical cross section showing a fluid-filled vibration damping device as a fourth embodiment of the present invention, taken along line 5-5 of FIG. 6.

Furthermore, FIG. 5 shows an engine mount 60 as the fourth embodiment of the present invention. Compared to the engine mount 10 of the first embodiment, the engine mount 60 of this embodiment uses in combination a separate mode of the orifice passage formed on the partition member, and a separate mode of the recess as the fluid retention area.

Figure 6:
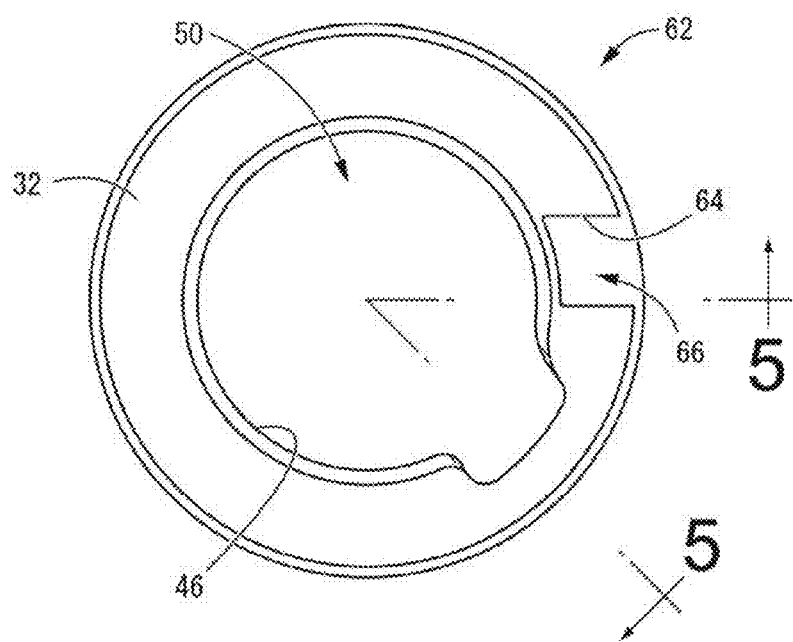
FIG. 6 is a plan view showing a partition member constituting the fluid-filled vibration damping device shown in FIG. 5.
Figure 7:
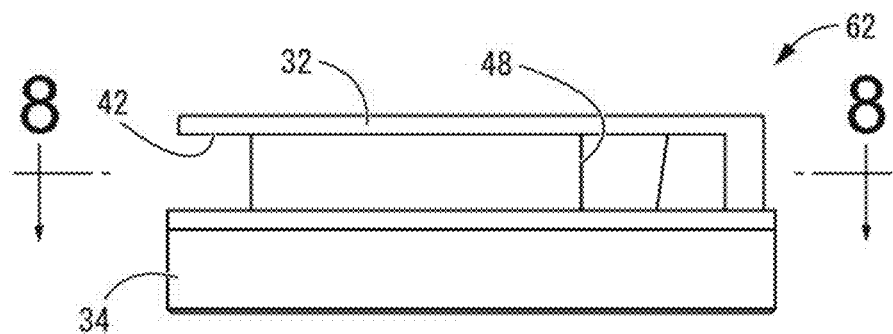
FIG. 7 is a front view of the partition member shown in FIG. 6.
Figure 8:
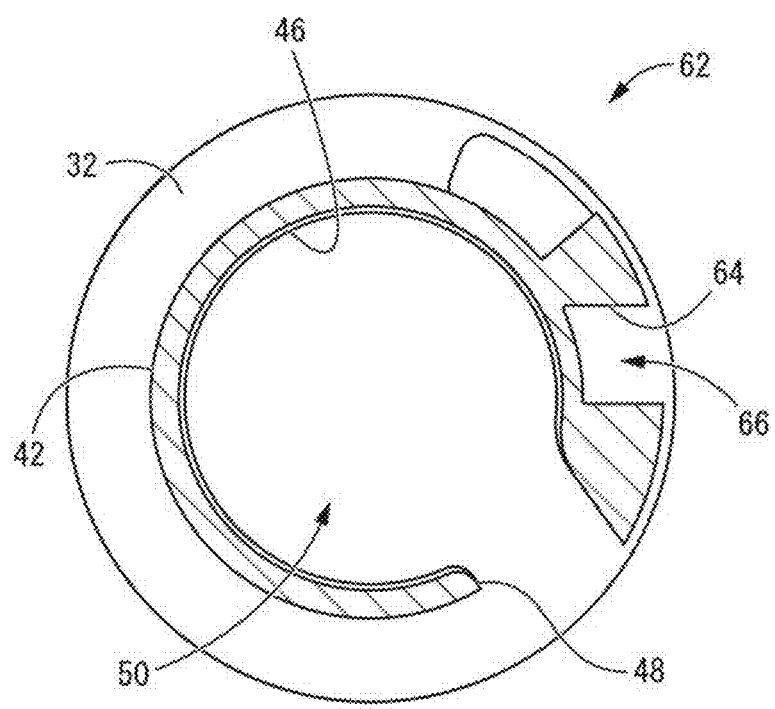
FIG. 8 is a cross section taken along line 8-8 of FIG. 7.

In specific terms, as shown by single item drawings in FIG. 6 to FIG. 8 as well, with a partition member 62 of this embodiment, the upper groove 42 extends at a length of one loop or less in the circumference direction on the upper partition plate 32, and a recess 64 is formed between both end parts in the circumference direction of the upper groove 42 at the part where the upper groove 42 is not formed. The same as with the first embodiment, both end parts in the circumference direction of the upper groove 42 form the orifice passage 40 connecting one each at the lower groove 44 and the primary liquid chamber 36.

This recess 64 is formed independently from the orifice passage 40 without being in communication with the upper groove 42. Also, the recess 64 is made to open at the primary liquid chamber 36, and the primary liquid chamber 36 is formed including the interior of the recess 64, and the inner surface of the recess 64 constitutes a portion of the inner surface of the primary liquid chamber 36. Also, the inner surface of this recess 64 is used as a low-adhesion energy surface 66. With this embodiment, the same as with the first embodiment, the inner surface of the large diameter circular recess 46 formed at the upper surface center part of the partition member 62 is also used as the low-adhesion energy surface 50.

Furthermore, while the recess 64 opens at the primary liquid chamber 36 facing upward, the opening part 48 of the orifice passage 40 to the primary liquid chamber 36 is formed piercing through the inner circumference wall of the circular recess 46, facing the axis-perpendicular direction. By so doing, the opening part of the recess 64 is formed at a position displaced from the opening direction to the primary liquid chamber 36 of the recess 64, there is a decrease in the effect on the recess 64 of the fluid pressure made to flow through the opening part 48 of the orifice passage 40, and a fluid retention area is effectively formed inside the recess 64. In particular with this embodiment, as shown in the cross section diagram of FIG. 8, in the circumference direction around the mounting center axis, the recess 64 is formed in an area within 90 degrees in relation to the opening part 48 of the orifice passage 40, and by doing that, the recess 64 is formed open at a position roughly entirely displaced from the fluid outflow and inflow direction of the orifice passage 40 to the primary liquid chamber 36.

Therefore, with the engine mount 60 of this embodiment, using the recess 64, the low-adhesion energy surface 66 is formed with a mode for which it is easier to avoid an adverse effect due to the fluid flow action inside the primary liquid chamber 36, and because of that, based on the air bubbles that appear on this low-adhesion energy surface 66, it is possible to more effectively exhibit the cavitation prevention effect by buffering the pressure changes of the primary liquid chamber 36.

Figure 9:
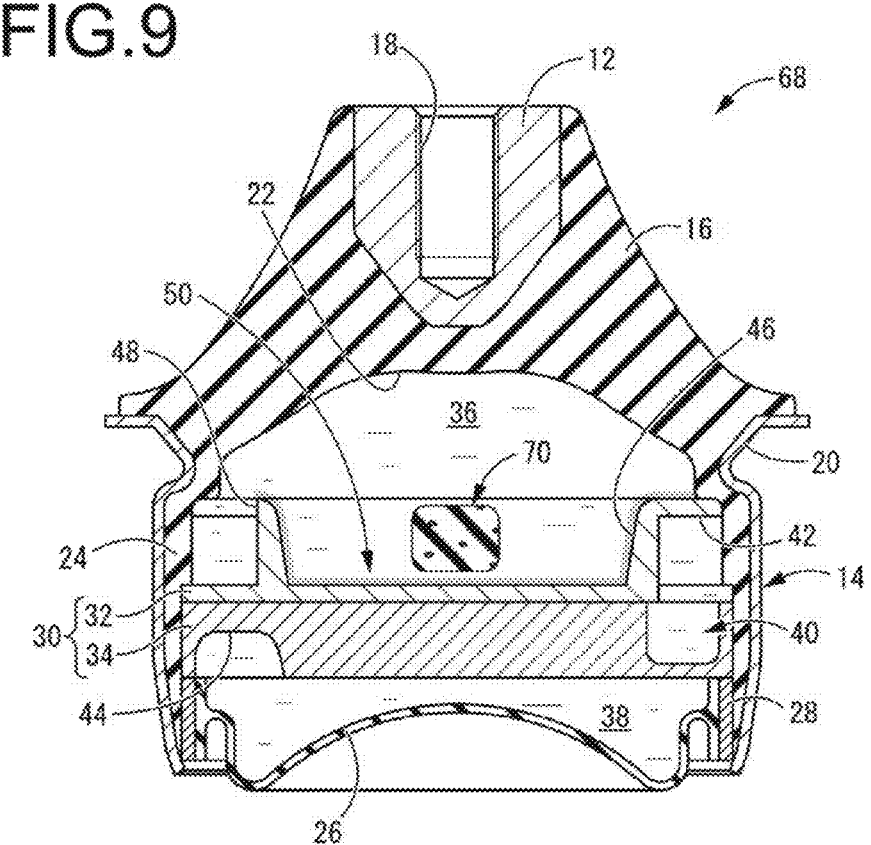
FIG. 9 is a vertical cross section showing a fluid-filled vibration damping device as a fifth embodiment of the present invention.

Also, FIG. 9 shows an engine mount 68 as the fifth embodiment of the present invention. The engine mount 68 of this embodiment is realized having a constitution with dissolved gas specially added to the sealed fluid with the engine mount 10 of the first embodiment.

In specific terms, with the engine mount 68 of this embodiment, by the gas mixing composite 70 being housed in the liquid sealing area with the manufacturing step of the engine mount 10, this composite 70 is an initial structure immersed in the scaled fluid. This composite 70 is a composite structure in which a solid or gel form dispersion medium that substantially disappears by decomposition or dissolving by immersion in the sealed fluid contains a dispersion material in dust or powder form that generates gas by foaming or non-foaming by dissolving by being exposed to the sealed fluid. With the present invention, dispersion inside the composite 70 means a state when, regardless of the powder size which is the dispersion material, or the dispersed or unevenly distributed state of the dispersion material or the like in the dispersion medium, in a state with the surface covered by the dispersion medium, the dispersion material is in a state contained inside the composite 70.

As the dispersion medium for the composite 70, for example it is possible to use gelatin, pectin, agar or the like, but in particular pectin and agar and the like melt easily at room temperature, so maintaining in a gel form is suitable. Also, as the dispersion material with the composite 70, for example it is possible to use ammonium chloride, ammonium sulfate or the like. Also, since the composite 70 is constituted in a state with the dispersion material surface coated with the dispersion medium, the dust or powder form dispersion material that generates gas can be handled easily in a block state. Also, by prescribing in advance the volume of dispersion material contained in one designated size composite 70, it is possible to easily contain the target gas volume with good precision in the sealed fluid, and possible to stably manufacture the target engine mount 68.

Specifically, with the engine mount 68 of this embodiment, by for example immersing an integral vulcanized molded component of the main rubber elastic body 16 including the first and second mounting members 12 and 14, and fitting and attaching separately prepared partition member 30 and diaphragm 26 to the integral vulcanized molded component of the main rubber elastic body 16 in sequence in the sealed fluid, after that, by doing shrinking processing of the opening part of the lower side of the second mounting member 14, it is possible to fill the sealing fluid and also to manufacture the engine mount main unit. At that time, for example before attaching the partition member 30 or the diaphragm 26, by housing the composite 70 as described above inside the integrally vulcanized molded component of the main rubber elastic body 16, it is possible to obtain the engine mount 68 of this embodiment shown in FIG. 9.

With the engine mount 68 manufactured in this way, at the time of manufacturing completion, as shown in FIG. 9, the composite 70 is housed in the primary liquid chamber 36, but as time elapses or the like after that, the dispersion medium of the composite 70 dissolves or the like and the dispersion material is exposed to the sealed fluid. By so doing, the dispersion material is gasified in the liquid sealing area constituted to be air tight, and is made to be contained in the sealed fluid as dissolved gas.

Therefore, according to this kind of engine mount 68 manufacturing method, it is possible to easily and with good precision contain dissolved gas in the sealed fluid filled in the liquid sealing area, and it is possible to more stably manufacture the target engine mount 68 according to the present invention.

Figure 10:
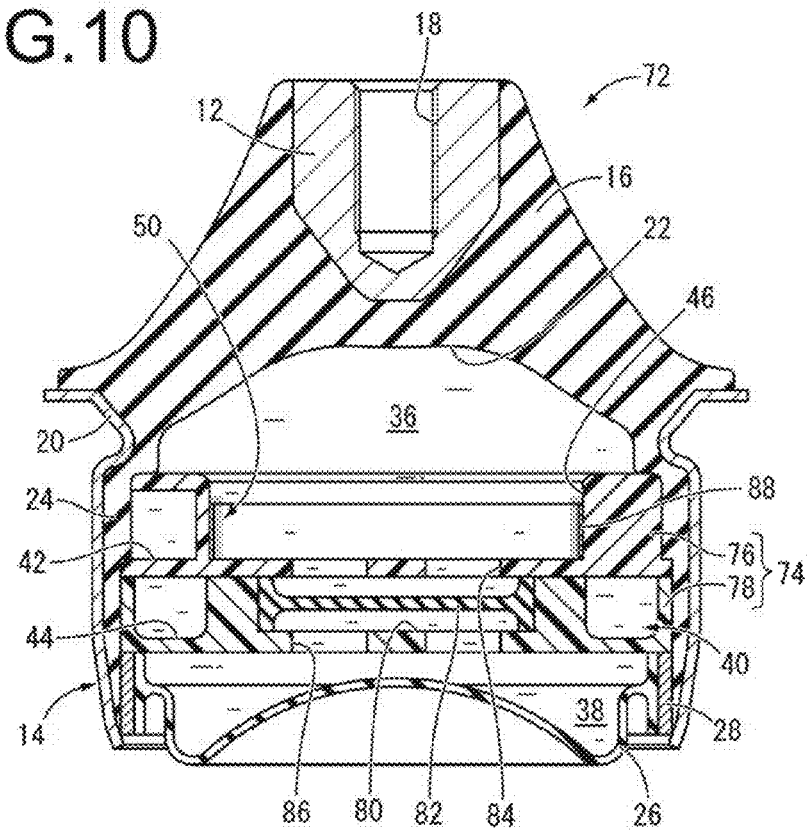
FIG. 10 is a vertical cross section showing a fluid-filled vibration damping device as a sixth embodiment of the present invention.
Figure 11:
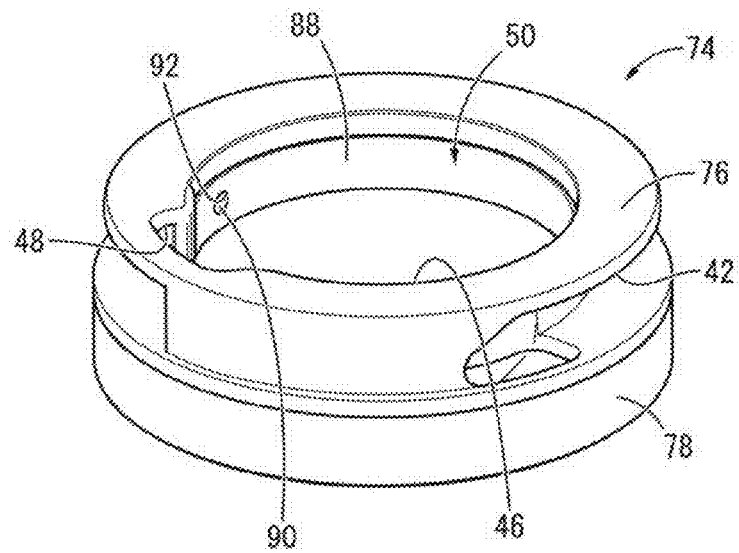
FIG. 11 is a perspective view showing a state with a water repellent member attached to a partition member constituting the fluid-filled vibration damping device of FIG. 10.
Figure 12:
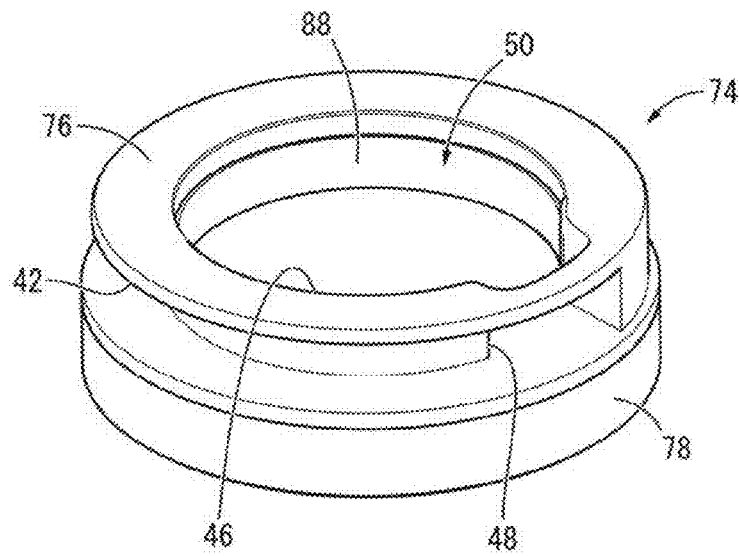
FIG. 12 is a perspective view of the partition member with the water repellent member shown in FIG. 11 from a different angle.

Next, FIG. 10 shows an engine mount 72 as the sixth embodiment of the present invention. With the engine mount 72 of this embodiment, instead of the partition member 30 with the engine mount 10 of the first embodiment, a partition member 74 shown in FIG. 11 and FIG. 12 is housed and arranged. This partition member 74 is constituted with an upper partition plate 76 and a lower partition plate 78, both having a roughly round disk shape, overlapping, and have roughly the same constitution as the partition member 30 with the first embodiment. With the drawings from FIG. 11 and thereafter, illustrations of a housing space 80, upper and lower through holes 84 and 86, and a movable film 82 for constituting the liquid pressure absorption mechanism are omitted.

With this embodiment, the housing space 80 is formed at the center part of the partition member 74, and the movable film 82 is arranged in the housing space 80 as the movable member. The movable film 82 is a rubber film exhibiting a roughly round disk shape, and the outer circumference end part is grasped above and below by the upper and lower partition plates 76 and 78 along the entire circumference. Also, the liquid pressure of the primary liquid chamber 36 is applied to the upper surface of the movable film 82 through the upper through hole 84, and the liquid pressure of the auxiliary liquid chamber 38 is applied to the lower surface through the lower through hole 86, and by the movable film 82 being elastically deformed by the relative pressure fluctuation of the primary liquid chamber 36 and the auxiliary liquid chamber 38, liquid absorption action is exhibited.

The upper partition plate 76 and the lower partition plate 78 constituting the partition member 74 of this embodiment are formed using a thermoplastic synthetic resin considering the excellent formability and weight reduction and the like. This thermoplastic synthetic resin is not especially limited, but for example it is possible to suitably use polyethylene, polypropylene, polyamide, polystyrene, polyvinyl chloride, polymethyl methacrylate, polyester, polycarbonate, polyacetal, cellulose acetate and the like.

Here, the same as with the first embodiment, the circular recess 46 is formed on the partition member 74 which is a constitutional member constituting the primary liquid chamber 36. Also, on the circumference wall inner surface of the circular recess 46, a water repellent member 88 is attached as an independent member, and the low-adhesion energy surface 50 is provided on the circumference wall inner surface of this circular recess 46.

Figure 13:
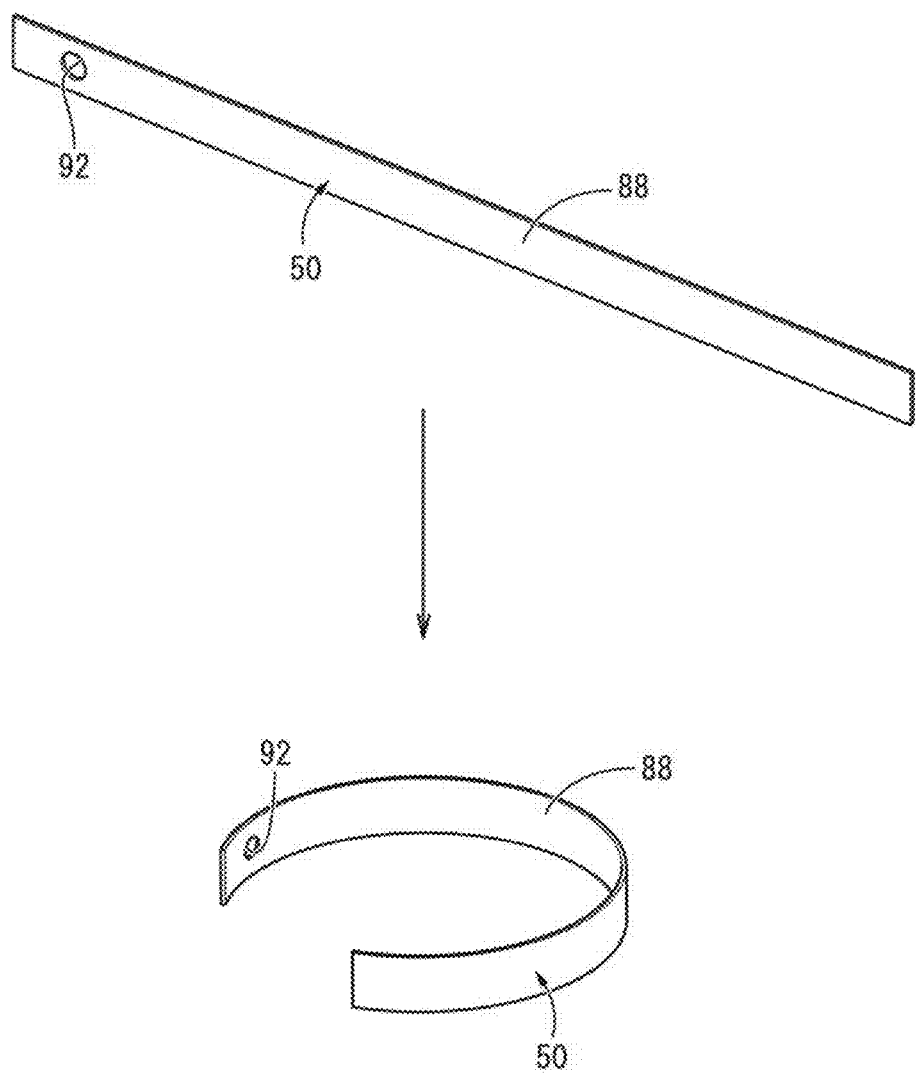
FIG. 13 is a single item drawing of the water repellent member shown in FIG. 11, and is a drawing suitable for describing a work process with which the water repellent is curved before mounting on the partition member.

In more specific detail, as shown in FIG. 13, the water repellent member 88 is a long rectangular plate shaped member, is formed using a metal such as an iron or aluminum alloy or the like, or a heat curing resin or thermoplastic resin or the like, and with this embodiment, it is given excellent elasticity for deformation in the thickness direction by being formed using stainless steel. Also, the water repellent member 88 is formed as a separate member, independent from the integrally vulcanized molded component of the main rubber elastic body 16 or the partition member 74 constituting the wall surface of the primary liquid chamber 36. Also, by having a coating layer of a hydrophobic material (non-polar substance) formed as the surface processed layer formed on the surface of the water repellent member 88, the surface of the water repellent member 88 is used as the low-adhesion energy surface 50.

Figure 14:
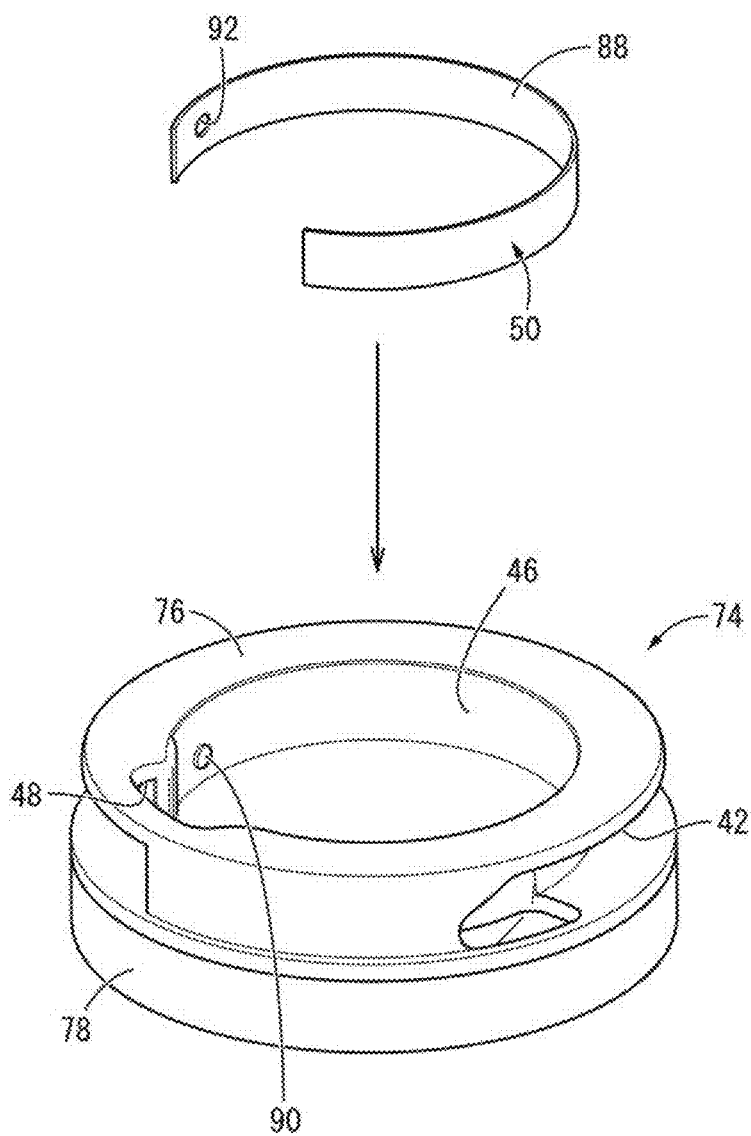
FIG. 14 is a drawing suitable for describing a work process of mounting the water repellent member in a curved state shown in FIG. 13 on the partition member.

In a state of being elastically curved in the thickness direction and extended in the circumference direction in a C ring shape as shown in FIG. 13, the water repellent member 88 having the low-adhesion energy surface 50 as noted above is inserted in the circular recess 46 of the upper partition plate 76 as shown in FIG. 14. By so doing, the water repellent member 88 is pressed against the circumference wall inner surface of the circular recess 46 based on its own elasticity, and is attached to the upper partition plate 76, and arranged so as to extend in the circumference direction overlapping in a state abutting the circumference wall inner surface of the primary liquid chamber 36.

In particular, with this embodiment, a round pillar shaped locking projection 90 projecting from the circumference wall inner surface of the circular recess 46 to the inner circumference side is provided, and a round locking hole 92 that pierces in the thickness direction near one end part in the lengthwise direction of the water repellent member 88 is formed, and by the locking projection 90 being inserted in and locked with the locking hole 92, falling out of the circular recess 46 by locking between the water repellent member 88 is prevented. In other words, with this embodiment, by the locking projection 90 of the partition member 74 and the locking hole 92 of the water repellent member 88, a positioning member is constituted that limits displacement of the water repellent member 88 relative to the surface of the partition member 74, which is a constitutional member constituting the primary liquid chamber 36, while positioning and holding the water repellent member 88 thereon.

Here, with the engine mount 72 of this embodiment, the low-adhesion energy surface 50 is provided on the surface of the water repellent member 88 which is a member formed as a separate member from the partition member 74, and by the water repellent member 88 being attached to the surface exposed to the primary liquid chamber 36 of the partition member 74, the low-adhesion energy surface 50 is provided on the wall inner surface of the primary liquid chamber 36. In this way, by forming the low-adhesion energy surface 50 on a separate part from the basic constitutional part of the fluid-filled vibration damping device, it is possible to easily provide the low-adhesion energy surface 50 on any site in the wall inner surface of the primary liquid chamber 36. In particular, when there is a requirement for a countermeasure for cavitation noise with the fluid-filled vibration damping device of the background art constitution, it is possible to easily implement an effective countermeasure simply by adding the water repellent member 88 attachment step.

In fact, even when providing the low-adhesion energy surface 50 using surface processing such as coating by baking or the like, it is possible to use thermoplastic synthetic resin or the like with excellent formability or the like, for example, without having to select an item for which surface processing is possible as a partition member forming material.

Also, with this embodiment, the water repellent member 88 is a standalone unit that is a band shaped rectangular plate, and by being inserted in the circular recess 46 in a state of being elastically curved in the thickness direction, the water repellent member 88 is pressed against the circumference wall inner surface of the circular recess 46 by its own elasticity. By so doing, an elastic holding force is exhibited, and the water repellent member 88 is attached non-adhesively to the partition member 74. In fact, the low-adhesion energy surface 50 is provided by surface processing of the water repellent member 88, and since it is possible to prevent limiting the material for forming the water repellent member 88 more than necessary; by forming using a material that has excellent elasticity such as stainless steel or the like, it is possible to attach the water repellent member 88 to the partition member 74 with sufficient holding force.

Furthermore, since the water repellent member 88 is arranged in a state of being curved in a C shape extending in the circumference direction along the circumference wall inner surface of the circular recess 46, it is possible to provide a liquid pressure absorption mechanism or the like using the movable film 82 in the inner circumference side area of the water repellent member 88. In this way, it is possible to use any vibration damping mechanism, relief mechanism or the like on the center part of the partition member 74 of this embodiment, so it is possible to realize with good space efficiency and in compact form the engine mount 72 that exhibits excellent vibration damping performance and the like.

Also, with the engine mount 72, the water repellent member 88 is positioned and held at a designated position on the partition member 74 not only by the elasticity of the water repellent member 88, but also by the locking of the locking projection 90 of the partition member 74 and the locking hole 92 of the water repellent member 88. However, the constitution of the positioning member is not limited to this kind of insertion and locking of the locking projection 90 in the locking hole 92, and for example as shown in FIG. 15 and FIG. 16, can also be realized by a pair of locking projections 96, 96 provided on a partition member 94 being locked with a pair of locking recesses 100, 100 provided on a water repellent member 98.

Figure 15:
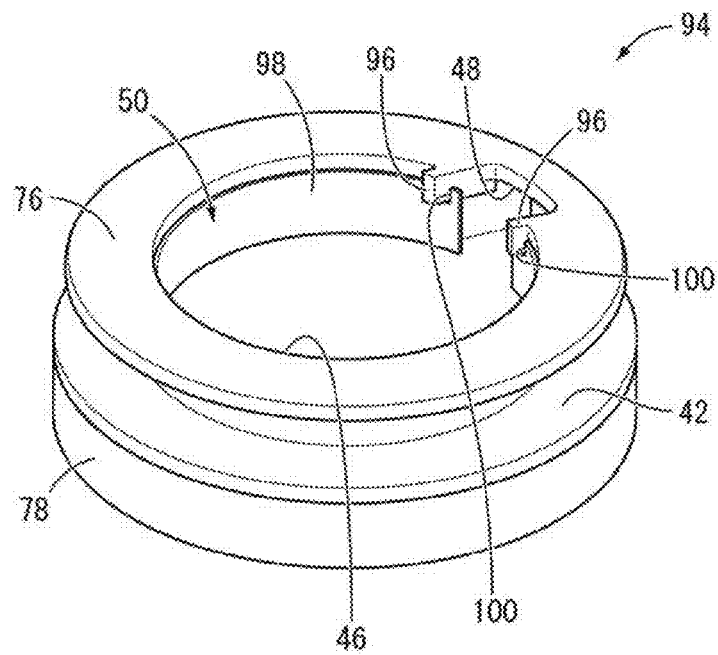
FIG. 15 is a perspective view showing another mode of the partition member with a water repellent member constituting the fluid-filled vibration damping device of the present invention.
Figure 16:
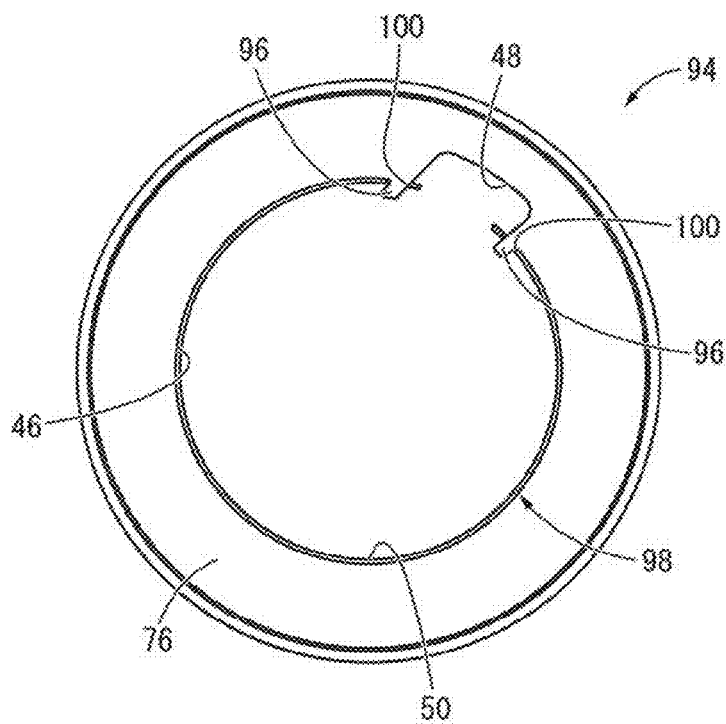
FIG. 16 is a plan view of the partition member with the water repellent member shown in FIG. 15.
Figure 17:
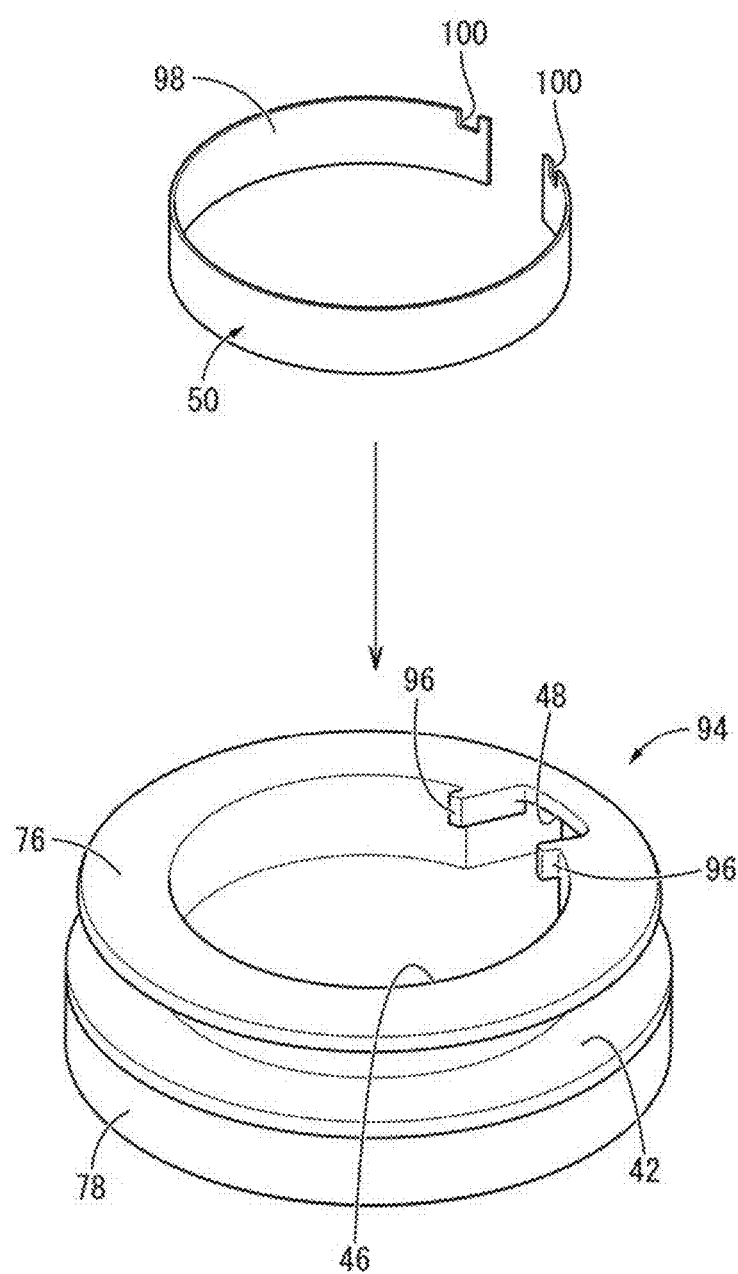
FIG. 17 is a drawing suitable for describing a work process of mounting the water repellent member in a curved state on the partition member, and forming the partition member with the water repellent member shown in FIG. 15.

Specifically, as shown in FIG. 15 through FIG. 17, the locking projections 96 project with roughly a rectangular cross section facing from the top edge part of the circumference wall of the circular recess 46 to the inner circumference side, and the pair is formed sandwiching the opening part 48 at both sides in the circumference direction. With this embodiment, the pair of locking projections 96, 96 are formed as an integral unit with the upper partition plate constituting the partition member 94.

The locking recesses 100 open at the top surface of the water repellent member 98 having a band shaped rectangular plate form, and have a notched form extending along the entire length in the thickness direction of the water repellent member 98, and by both being provided respectively on both end parts in the lengthwise direction of the water repellent member 98, the water repellent member 98 is provided in a state of being curved in a C shape at both end parts in the circumference direction, and is arranged separated by a designated distance in the circumference direction.

Also, by having the water repellent member 98 inserted in the circular recess 46 in a curved state, and fitting the pair of locking recesses 100, 100 from below to the pair of locking projections 96, 96, falling out from the circular recess 46 and position skew in the circumference direction are prevented at both end parts in the circumference direction of the water repellent member 98. By so doing, the positioning member is constituted by the locking of the pair of locking projections 96, 96 and the pair of locking recesses 100, 100. It is also possible to further provide one or a plurality of the locking projections 96 on the circumference of the circular recess 46, and to further provide one or a plurality of the locking recesses 100 on the center part of the water repellent member 98, and to have the positioning action exhibited by the circumference direction center part by locking of the locking projections 96 and the locking recesses 100. The positioning member is not essential, and for example when the independent member is sufficiently positioned in relation to the wall inner surface of the primary liquid chamber 36 by only its own elasticity, it is not necessary to provide a special positioning member as described above.

Figure 18:
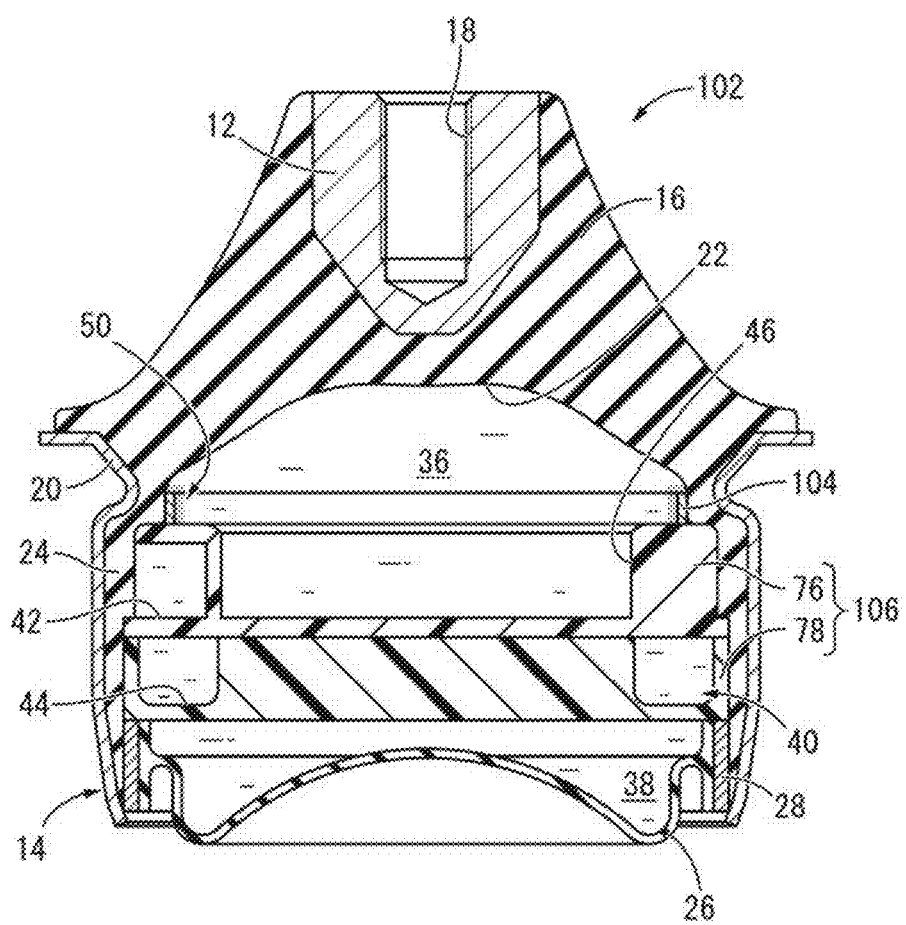
FIG. 18 is a vertical cross section showing a fluid-filled vibration damping device as a seventh embodiment of the present invention.

FIG. 18 shows an engine mount 102 as the seventh embodiment of the present invention. With this engine mount 102, a water repellent member 104 as the independent member is attached to the inner circumference surface of the main rubber elastic body 16 constituting the wall inner surface of the primary liquid chamber 36.

Specifically, the water repellent member 104 has a ring shape extending continuously along the entire circumference with a roughly fixed rectangular cross section, and the surface is used as the low-adhesion energy surface 50. Also, before attaching a partition member 106 to the integral vulcanized molded component of the main rubber elastic body 16, the water repellent member 104 is inserted in the large-diameter recess 22 of the main rubber elastic body 16. The water repellent member 104 has its outer diameter dimensions made larger than the inner diameter dimensions of the opening part of the large-diameter recess 22, and by fitting it while pushing and broadening the main rubber elastic body 16 in the radial direction, it is held in an attached state by the elasticity of the main rubber elastic body 16. Also, after mounting of the water repellent member 104 on the main rubber elastic body 16, by the partition member 106 and the diaphragm 26 being fixed to the second mounting member 14, the bottom surface of the water repellent member 104 abuts the top end surface of the partition member 106, and falling out of the water repellent member 104 downward is prevented.

With this kind of engine mount 102 as well, by having the water repellent member 104 which is a separate member from the partition member 106 be attached in a state overlapping the inner circumference surface, the low-adhesion energy surface 50 is provided on the wall inner surface of the primary liquid chamber 36. Because of that, the same as with the engine mount 10 of the first embodiment, the occurrence of cavitation noise is prevented easily, and a level of freedom is ensured for the forming material, shape and the like of the partition member and the main rubber elastic body.

As is clear from this embodiment as well, if the attachment position of the independent member equipped with the low-adhesion energy surface 50 (water repellent member) is the part constituting the wall inner surface of the primary liquid chamber 36, rather than being limited to the surface of the partition member, it is also possible to be the surface of the main rubber elastic body 16. Also, as with this embodiment, when the water repellent member 104 is attached to the main rubber elastic body 16, for example even if the upper partition plate is a thin walled round disk shaped metal plate and the circular recess 46 is omitted, it is possible to attach the water repellent member 104 to the circumference wall inner surface of the primary liquid chamber 36, and possible to more freely set the constitution of the partition member.

Figure 19:
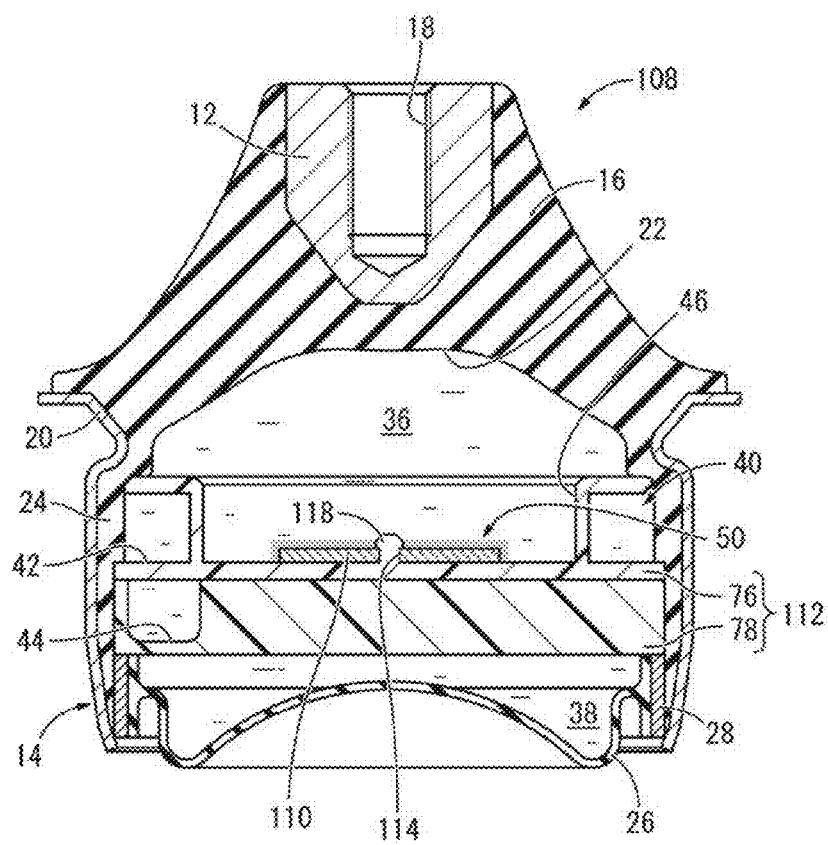
FIG. 19 is a vertical cross section showing a fluid-filled vibration damping device as an eighth embodiment of the present invention.

FIG. 19 shows an engine mount 108 as the eighth embodiment of the present invention. With the engine mount 108 of this embodiment, a water repellent member 110 as the independent member is overlapped on the bottom surface of the circular recess 46 on a partition member 112 and attached.

In more specific detail, the water repellent member 110 has a round disk shape, and a round insertion hole 114 that pierces through in the thickness direction is formed on the radial direction center. Also, with the water repellent member 110, by having surface processing such as coating or the like using fluorine resin implemented, the low-adhesion energy surface 50 is formed on the surface.

Figure 20:
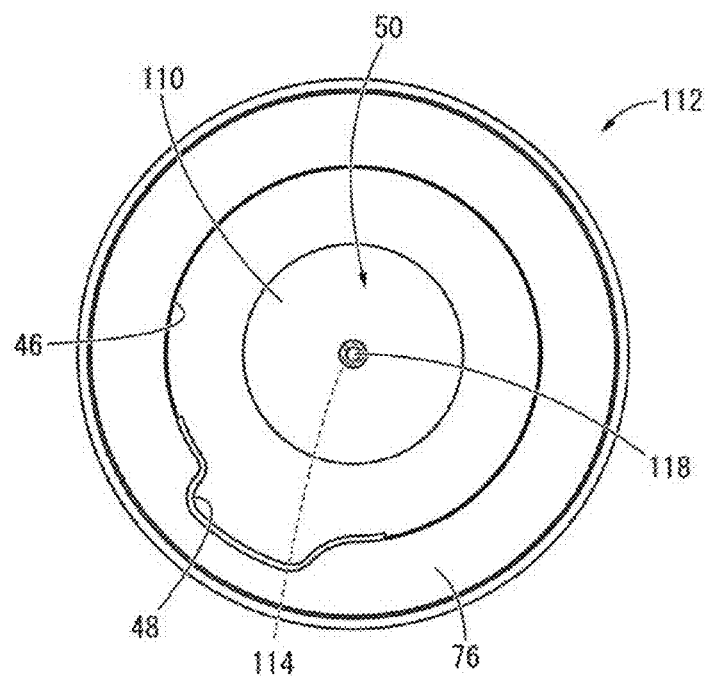
FIG. 20 is a plan view of a partition member with a water repellent member constituting the fluid-filled vibration damping device shown in FIG. 19.

Also, as shown in FIGS. 19 and 20, the water repellent member 110 is overlapped on the bottom wall part of the circular recess 46 at the upper partition plate 76 constituting the partition member 112, and by a support projection 118 projecting upward from the bottom wall center of the circular recess 46 being inserted in the insertion hole 114, this is held in a fixed manner to the center top surface of the upper partition plate 76. By so doing, the low-adhesion energy surface 50 is provided at the bottom wall surface of the circular recess 46 constituting the wall inner surface of the primary liquid chamber 36. With the support projection 118, the base end part has a smaller diameter than the tip part, and the tip part has a tapered shape for which the diameter gradually becomes smaller facing upward, and it is possible to insert from below to the insertion hole 114, and falling out of the water repellent member 110 upward is prevented.

In this way, the independent member equipped with the low-adhesion energy surface is not necessarily limited to being a shape extending in the circumference direction, and the attachment site is also not limited to being the circumference wall as long as it is the wall inner surface of the primary liquid chamber 36. The support projection for supporting the water repellent member can also be provided so as to project from the upper base wall surface of the large-diameter recess 22, formed integrally with the main rubber elastic body 16 or the first mounting member 12, and the water repellent member can also be arranged overlapping the main rubber elastic body 16.

Figure 21:
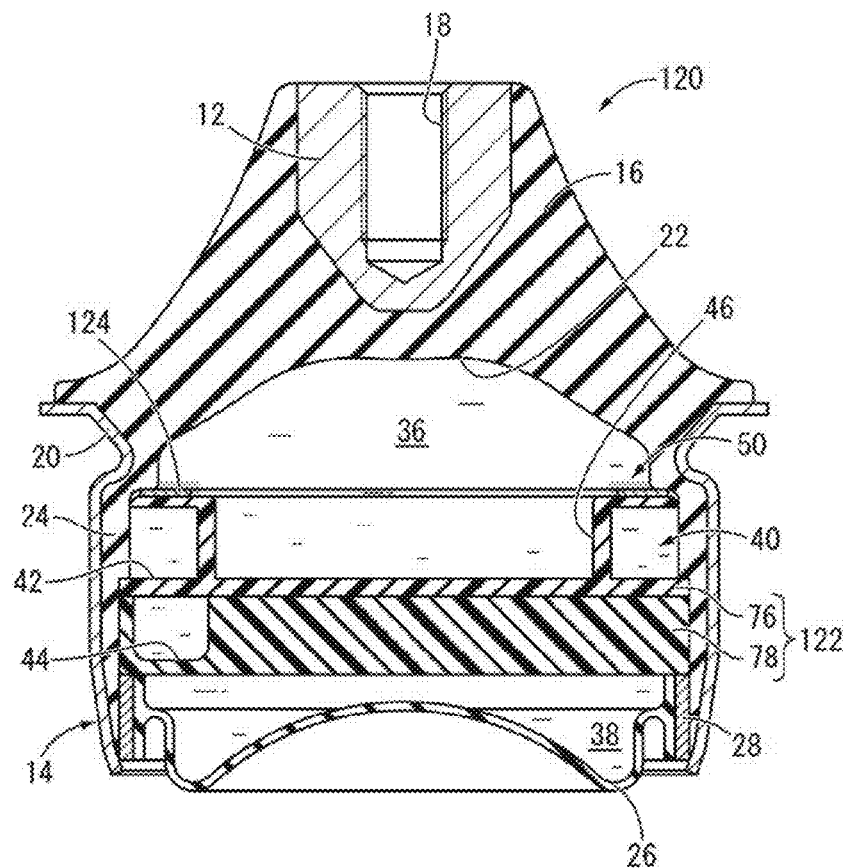
FIG. 21 is a vertical cross section showing a fluid-filled vibration damping device as a ninth embodiment of the present invention.

FIG. 21 shows an engine mount 120 as the ninth embodiment of the present invention. With the engine mount 120 of this embodiment, there is a constitution for which a water repellent member 124 as the independent member is grasped between the main rubber elastic body 16 and a partition member 122.

Figure 22:
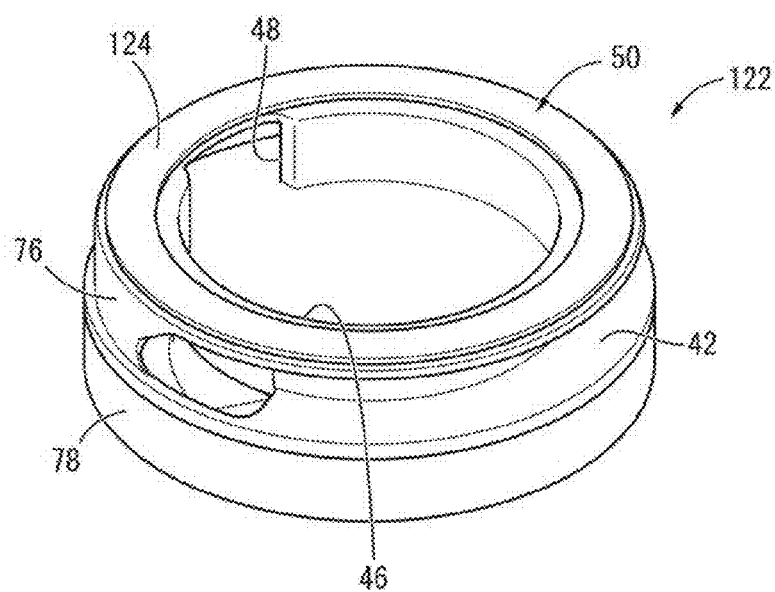
FIG. 22 is a perspective view of a partition member with a water repellent member constituting the fluid-filled vibration damping device shown in FIG. 21.

In more specific detail, the water repellent member 124 has a round ring plate shape continuous in the circumference direction with a roughly fixed cross section, and the low-adhesion energy surface 50 is provided on the surface. As shown in FIG. 22, this water repellent member 124 is overlapped on the top surface of the thick walled part further to the outer circumference side than the circular recess 46 (outer circumference part on which the upper groove 42 is formed). The water repellent member 124 can be placed only on the top surface of the partition member 122, but if positioned by a means such as adhesion or locking or the like, the attachment work described later to the integrated vulcanized molded component of the main rubber elastic body 16 is easier.

Also, the water repellent member 124 and the partition member 122 are inserted in the second mounting member 14, and the partition member 122 is fixed to the second mounting member 14 by a diameter reduction process such as all-direction shrinking or the like on the second mounting member 14, and also, the outer circumference part of the water repellent member 124 is grasped along the entire circumference between the lower surface of the main rubber elastic body 16 and the upper surface of the partition member 122. With the water repellent member 124 in a state grasped between the main rubber elastic body 16 and the partition member 122, the inner circumference part projects above the opening part of the large-diameter recess 22, and the inner circumference part is arranged above the wall inner surface of the primary liquid chamber 36, so the low-adhesion energy surface 50 is provided on the wall inner surface of the primary liquid chamber 36 by the arrangement of the water repellent member 124.

With the engine mount 120 having a constitution for which the water repellent member 124 is grasped between the main rubber elastic body 16 and the partition member 122 in this way, the same as with the engine mount 10 of the first embodiment, it is possible to easily realize a reduction in the cavitation noise. In fact, since the water repellent member 124 is held more stably at a designated position, adverse effects on the vibration damping characteristics or noise reduction effect due to position skew or falling out of the water repellent member 124 are prevented, and it is possible to obtain stable performance.

Figure 23:
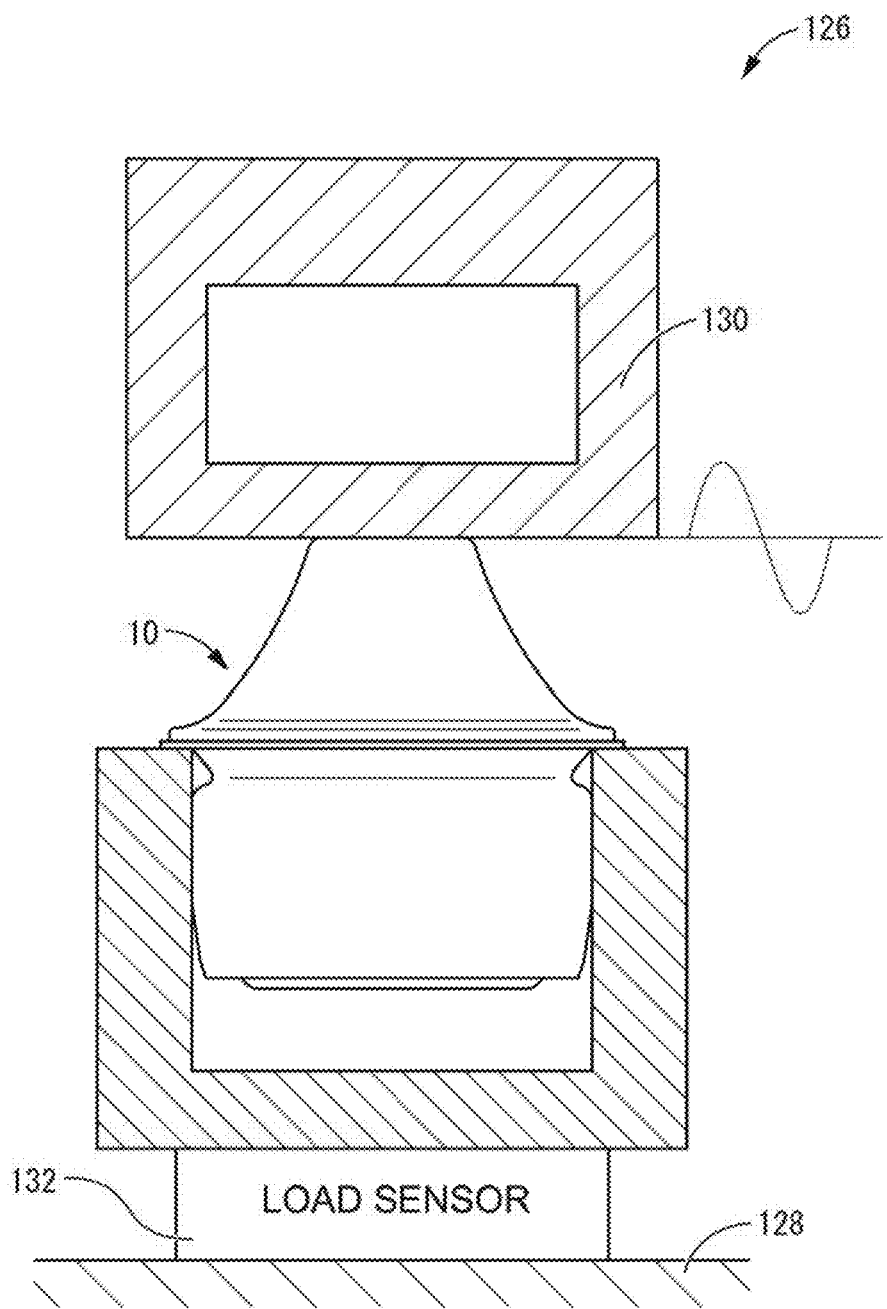
FIG. 23 is a drawing suitable for describing a testing device for measuring vibration damping characteristics of the fluid-filled vibration damping device.
Figure 24:
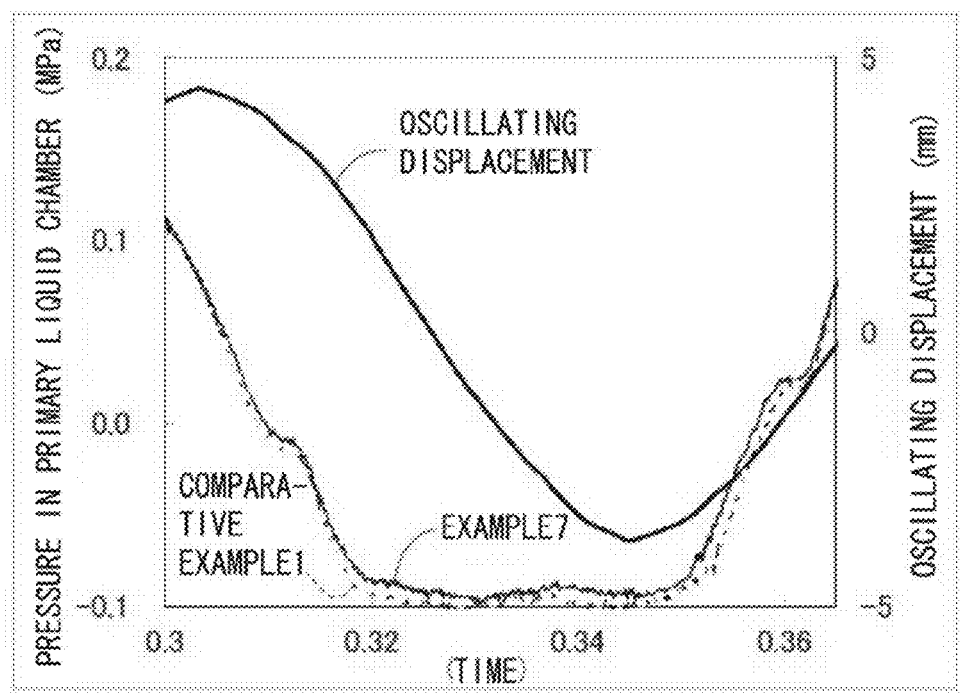
FIG. 24 is a graph representing the pressure in a primary liquid chamber during vibration input as the result of vibration damping characteristics measured for an article of the present invention of the constitution shown in FIG. 1 using the testing device shown in FIG. 23 together with the measurement results of a Comparative Example.
Figure 25:
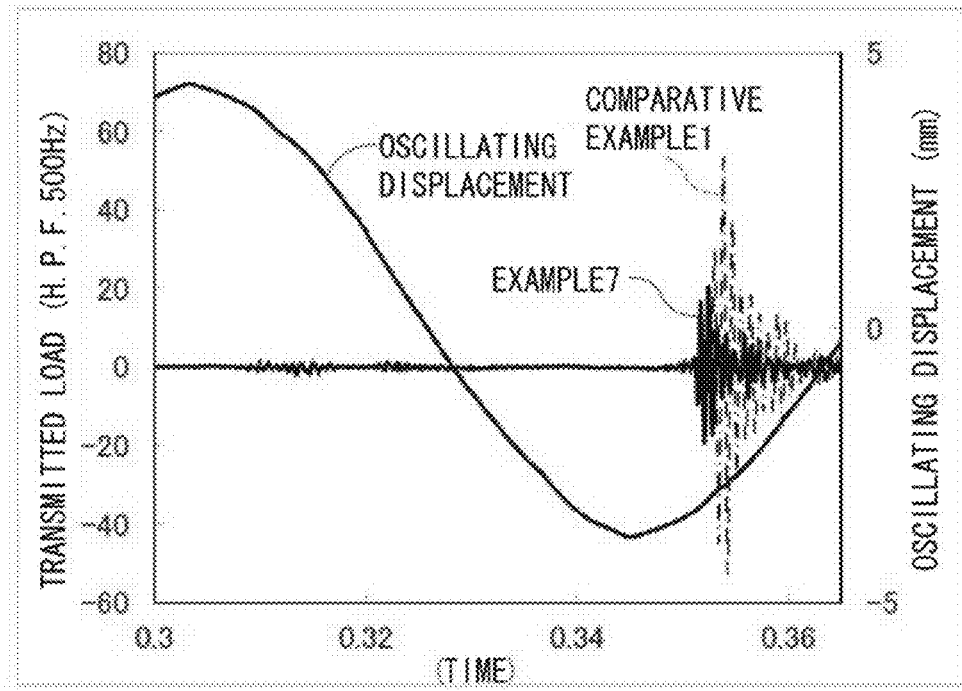
FIG. 25 is a graph representing the transmitted load during vibration input as the result of vibration damping characteristics measured for the article of the present invention of the constitution shown in FIG. 1 using the testing device shown in FIG. 23 together with the measurement results of a Comparative Example.

Incidentally, to confirm the effects of the present invention, the engine mount 10 constituted according to the first embodiment was produced, and as shown in FIG. 23, that engine mount 10 was set in a testing device 126 and underwent actual measurement of vibration damping characteristics. This testing device 126 has the engine mount 10 set between a base member 128 and an oscillator 130, and is made to detect the load transmitted from the oscillator 130 to the base member 128 via the engine mount 10 using a load sensor 132. For the signal detected by the load sensor 132, the vibration load of the subject vibration count area is detected through a high pass filter (500 Hz). Also, when doing this experiment, a pressure sensor is arranged inside the primary liquid chamber 36, and in combination with the changes in transmitted load in relation to the oscillating displacement of the oscillator 130, the pressure changes inside the primary liquid chamber 36 were actually measured. The obtained results are shown in Table 1 below, and the measurement results for Example 7 and Comparative Example 1 in Table 1 are shown together in FIG. 24 and FIG. 25. With Comparative Examples 1 through 3 in Table 1, an engine mount for which a low-adhesion energy surface was not provided was used as the comparative subject. Also, inside the respective parentheses at the level of "water contact angle (°) of the constitutional member constituting the primary liquid chamber," with Examples 1 through 9, the material of the coating layer giving low-adhesion energy surface is shown, and with Comparative Examples 1 through 3, the material of the partition member (upper partition plate) is shown. Furthermore, PPS which is the material of the upper partition plate of Comparative Examples 1 and 3 indicates poly phenyl sulfide resin which is a thermoplastic resin, and A6061 which is the material of the upper partition plate of Comparative Example 2 is an aluminum alloy containing silicon and magnesium as the additive elements.

TABLE 1

Experiment Results of Examples and Comparative Examples

| | | Comp. Ex. 1 | Ex. 1 | Ex. 2 | Ex. 3 | Ex. 4 | Ex. 5 | Comp. Ex. 2 | Comp. Ex. 3 | Ex. 6 | Ex. 7 | Ex. 8 | Ex. 9 |
|---|---|---|---|---|---|---|---|---|---|---|---|---|---|
| Water contact angle (°) of constitutional member constituting the primary liquid chamber | | 84° (PPS) | 93° (Silicone) | 93° (Silicone) | 93° (Silicone) | 93° (Silicone) | 93° (Silicone) | 86° (A6061) | 84° (PPS) | 93° (Silicone) | 105° (PTFE) | 105° (PTFE) | 105° (PTFE) |
| Liquid (weight %) | First liquid: Ethylene glycol | 70 | 70 | 70 | 70 | 70 | 70 | 70 | 70 | 70 | 70 | 70 | 70 |
| | Second liquid: Propylene glycol | 30 | 30 | 30 | 30 | 30 | 30 | 30 | 30 | 30 | 30 | 30 | 30 |

TABLE 1-continued

Experiment Results of Examples and Comparative Examples

| | | Comp. Ex. 1 | Ex. 1 | Ex. 2 | Ex. 3 | Ex. 4 | Ex. 5 | Comp. Ex. 2 | Comp. Ex. 3 | Ex. 6 | Ex. 7 | Ex. 8 | Ex. 9 |
|---|---|---|---|---|---|---|---|---|---|---|---|---|---|
| Gas (volume %) | Oxygen | 0.2 | 0.2 | | | | | | | | | | |
| | Carbon dioxide | | | 0.3 | | | | 0.3 | | | | | |
| | Ammonia | | | | 80 | 100 | | 20 | 150 | 150 | 80 | 150 | |
| Solid (powder) (weight %) | Ammonium chloride | | | | | | 0.5 | | | | | | 0.5 |
| Transmitted load | | 100 | 42 | 36 | 34 | 22 | 16 | 74 | 65 | 22 | 30 | 14 | 12 |

From these measurement results, by using the sealed fluid containing dissolved gas at 0.03 volume % or greater at room temperature and normal atmosphere according to the present invention, and by providing the low-adhesion energy surface with a water contact angle of 90 degrees or greater on the primary liquid chamber, it is possible to reduce the pressure drop of the primary liquid chamber during input of excessive vibration loads, and we can see that it is possible to suppress the occurrence of noise and the like due to impact load. The volume of ammonium chloride dust (weight %) that generates dissolved gas in the sealed fluid used with Examples 5 and 9 is 230 volume % in either case when converted to gas volume %. Also, as a result of further examination including this kind of measurement results, with the present invention, it is preferable to have the dissolved gas volume be 100 volume % or greater, and by doing that, it is possible to suppress the transmitted load due to cavitation to 30% or less compared to the background art manufactured article.

Above, we gave a detailed description of embodiments of the present invention, but the present invention is not limited to those specific descriptions. For example, with the first through fifth embodiments, the low-adhesion energy surface 50 was formed along the entire circumference in the circumference direction, but it is also possible to use a form for which it is formed at a plurality of locations in the circumference direction. Also, with the sixth through ninth embodiments, shown by example was a constitution for which only one independent member equipped with the low-adhesion energy surface 50 was arranged, but it is also possible to arrange a plurality of independent members that are mutually independent on the wall inner surface of the primary liquid chamber 36, and to provide a plurality of low-adhesion energy surfaces on the wall inner surface of the primary liquid chamber.

Also, the low-adhesion energy surface can be formed in any position, shape, or size on the surface exposed to the primary liquid chamber 36, and for example can also be arranged such that the independent member enters the orifice passage 40, and the low-adhesion energy surface broadens up to the inner surface of the orifice passage 40.

Furthermore, when using the independent member, for example by forming a projection that projects toward the primary liquid chamber 36 at the radial direction middle part of the partition member, and externally fitting the ring shaped independent member equipped with the low-adhesion energy surface on that projection, it is also possible to provide the low-adhesion energy surface on the wall inner surface of the primary liquid chamber 36.

Also, when the low-adhesion energy surface is formed on the surface of the independent member, it is also possible to be provided on the entire surface of the independent member, but it is also possible to provide it partially on the surface of the independent member, such as providing it only on the surface exposed to the primary liquid chamber 36 or the like.

The application scope of the present invention is not necessarily limited to engine mounts, and it is also possible to apply it to various types of fluid-filled vibration damping devices such as a body mount, sub frame mount, diff mount or the like. Also, the present invention is not limited to being a fluid-filled vibration damping device used for automobiles, and can also be suitably used for fluid-filled vibration damping devices used for motorcycles, railroad vehicles, industrial vehicles and the like.

What is claimed is:

1. A fluid-filled vibration damping device comprising:
   a primary liquid chamber which gives rise to pressure fluctuations based on deformation of a main rubber elastic body at times of vibration input;
   an auxiliary liquid chamber which gives rise to pressure fluctuations relative to the primary liquid chamber at times of vibration input; and
   an orifice passage that allows flow action of a sealed fluid between the primary liquid chamber and the auxiliary liquid chamber, wherein
   the sealed fluid contains at least 0.03 volume % of a dissolved gas under atmospheric pressure at room temperature, and
   a low-adhesion energy surface with a water contact angle of at least 90 degrees is provided on an inner surface of the primary liquid chamber at a portion separated from an inner surface of the orifice passage.

2. The fluid-filled vibration damping device according to claim 1, wherein the volume of the dissolved gas contained in the sealed fluid is not greater than 61200 volume % under atmospheric pressure at room temperature.

3. The fluid-filled vibration damping device according to claim 1, wherein the low-adhesion energy surface is provided directly on a surface of a constitutional member constituting the primary liquid chamber.

4. The fluid-filled vibration damping device according to claim 1, wherein the low-adhesion energy surface is provided by attaching an independent member having a low-adhesion energy surface with a water contact angle of at least 90 degrees on its surface to the surface of the constitutional member constituting the primary liquid chamber.

5. The fluid-filled vibration damping device according to claim 4, wherein the independent member extends in a circumference direction, and the independent member is overlapped on and attached to an inner surface of a circumference wall provided in the primary liquid chamber.

6. The fluid-filled vibration damping device according to claim 5, wherein the independent member is housed in the primary liquid chamber in an elastically curved state so as to extend in the circumference direction, and the independent member is pressed against and attached to the inner surface of the circumference wall provided in the primary liquid chamber by its own elasticity.

7. The fluid-filled vibration damping device according to claim 5, wherein the independent member has a ring shape, and the independent member is fitted into and attached to the inner surface of the circumference wall provided in the primary liquid chamber.

8. The fluid-filled vibration damping device according to claim 4, wherein a positioning member is provided that limits displacement of the independent member relative to the surface of the constitutional member constituting the primary liquid chamber.

9. The fluid-filled vibration damping device according to claim 1, wherein the low-adhesion energy surface is formed by a surface processed layer provided on a surface of a member exposed to the sealed fluid of the primary liquid chamber.

10. The fluid-filled vibration damping device according to claim 1, further comprising:
    a first mounting member and a second mounting member respectively attached to members constituting a vibration transmission system while being connected by the main rubber elastic body; and
    a partition member supported by the second mounting member, wherein
    the primary liquid chamber whose wall is partially constituted by the main rubber elastic body is formed on a first side of the partition member, while the auxiliary liquid chamber is formed on a second side of the partition member, and
    the low-adhesion energy surface is provided on a surface of the first side of the partition member.

11. The fluid-filled vibration damping device according to claim 10, wherein the low-adhesion energy surface is provided on at least one of a surface exposed to the sealed fluid of the primary liquid chamber on the partition member which serves as a constitutional member constituting the primary liquid chamber and a surface exposed to the sealed fluid of the primary liquid chamber on a separate member attached to the partition member.

12. The fluid-filled vibration damping device according to claim 11, wherein the partition member or the separate member on which the low-adhesion energy surface is provided is formed using a thermoplastic synthetic resin.

13. The fluid-filled vibration damping device according to claim 1, wherein a fluid retention area having irregularities is provided on the inner surface of the primary liquid chamber, and the low-adhesion energy surface is formed on an inner surface of the fluid retention area.

14. The fluid-filled vibration damping device according to claim 13, wherein the fluid retention area is formed with a recess shape opening in the primary liquid chamber.

15. The fluid-filled vibration damping device according to claim 1, wherein a powder body to be gasified by being exposed to the sealed fluid is sealed in a containing area of the sealed fluid, and the gasified powder body serves as the dissolved gas.

16. The fluid-filled vibration damping device according to claim 15, wherein a dispersion material composed of the powder body is sealed in the containing area of the sealed fluid as a gas mixing composite constituted by a surface of the dispersion material being coated by a solid or gel form dispersion medium to be dissolved in the sealed fluid.

17. The fluid-filled vibration damping device according to claim 16, wherein the solid or gel form dispersion medium is one of gelatin, pectin, and agar.

18. The fluid-filled vibration damping device according to claim 15, wherein a dispersion material composed of the powder body includes at least one substance selected from the group consisting of ammonium chloride, ammonium sulfate, ammonium hydroxide, ammonium bicarbonate, and ammonium carbonate.

19. The fluid-filled vibration damping device according to claim 1, wherein the low-adhesion energy surface has a contact angle of at least 90 degrees in the sealed fluid with respect to air bubbles that appear due to aeration caused by a pressure decrease in the primary liquid chamber.

20. A manufacturing method of a fluid-filled vibration damping device that includes a primary liquid chamber which gives rise to pressure fluctuations based on deformation of a main rubber elastic body at times of vibration input, an auxiliary liquid chamber which gives rise to pressure fluctuations relative to the primary liquid chamber at times of vibration input, and an orifice passage that allows flow action of a sealed fluid between the primary liquid chamber and the auxiliary liquid chamber, the method comprising the steps of:
    providing a low-adhesion energy surface with a water contact angle of at least 90 degrees to at least a part of a surface of the primary liquid chamber exposed to the sealed fluid at a portion separated from an inner surface of the orifice passage;
    preparing a gas mixing composite constituted by a surface of a dispersion material composed of a powder body to be gasified by being exposed to the sealed fluid being coated by a solid or gel form dispersion medium to be dissolved in the sealed fluid;
    housing the gas mixing composite in a containing area of the sealed fluid and filling the sealed fluid in the containing area; and
    arranging the powder body gasified inside the sealed fluid filled in the containing area so as to be contained as a dissolved gas of the sealed fluid at a concentration of at least 0.03 volume %.

* * * * *